(12) United States Patent
Ohmura et al.

(10) Patent No.: US 7,158,842 B2
(45) Date of Patent: Jan. 2, 2007

(54) AUDIO SYSTEM AND ITS CONTENTS REPRODUCTION METHOD, AUDIO APPARATUS FOR A VEHICLE AND ITS CONTENTS REPRODUCTION METHOD, COMPUTER PROGRAM PRODUCT AND COMPUTER-READABLE STORAGE MEDIUM

(75) Inventors: Hiroshi Ohmura, Hiroshima-ken (JP); Masao Ushio, Hiroshima-ken (JP); Kouji Hosoda, Hiroshima-ken (JP); Shigefumi Hirabayashi, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 1382 days.

(21) Appl. No.: 09/827,919

(22) Filed: Apr. 9, 2001

(65) Prior Publication Data
US 2001/0028717 A1     Oct. 11, 2001

(30) Foreign Application Priority Data
Apr. 11, 2000   (JP)   ............................. 2000-108852

(51) Int. Cl.
G06F 17/00 (2006.01)
H04B 1/00 (2006.01)
H04B 1/06 (2006.01)
H05K 11/02 (2006.01)

(52) U.S. Cl. ........................... 700/94; 381/86; 455/345
(58) Field of Classification Search ................. 700/94; 381/86; 455/345; 726/26, 31, 33, 35
See application file for complete search history.

(56) References Cited

U.S. PATENT DOCUMENTS

| 4,424,574 | A | * | 1/1984 | Enoki et al. ................... 713/1 |
| 5,319,716 | A | | 6/1994 | McGreevy |
| 5,661,811 | A | * | 8/1997 | Huemann et al. ............. 381/86 |
| 5,831,906 | A | * | 11/1998 | Yih et al. .............. 365/189.04 |
| 5,970,227 | A | * | 10/1999 | Dayan et al. .................. 726/34 |
| 5,970,390 | A | | 10/1999 | Koga et al. |
| 6,362,730 | B1 | * | 3/2002 | Razavi et al. ................. 701/29 |
| 6,526,335 | B1 | * | 2/2003 | Treyz et al. .................. 701/36 |
| 6,563,769 | B1 | * | 5/2003 | Van Der Meulen ...... 707/104.1 |

FOREIGN PATENT DOCUMENTS

| EP | 0 833 336 A1 | 4/1998 |
| EP | 0 950 570 A2 | 10/1999 |
| JP | 10-240207 | 9/1998 |
| JP | 11-030986 | 2/1999 |
| WO | WO 98/19486 | 5/1998 |

OTHER PUBLICATIONS

Specification of the Bluetooth System, Version 1.0 B, pp. 41-42, 194-195, 225.*

* cited by examiner

*Primary Examiner*—Sinh Tran
*Assistant Examiner*—Daniel R. Sellers

(57) ABSTRACT

An audio apparatus (audio system) made up of the car-mounted audio apparatus 100 and portable audio apparatuses 200a and 200b transmits/receives contents data such as music via radio communication. As the communication system in this in-car radio communication, a short-distance data communication system is used, which allows respective apparatuses to recognize and authenticate with one another and perform data communication between those apparatuses.

9 Claims, 15 Drawing Sheets

AUDIO SYSTEM AND ITS CONTENTS REPRODUCTION METHOD, AUDIO APPARATUS FOR A VEHICLE AND ITS CONTENTS REPRODUCTION METHOD, COMPUTER PROGRAM PRODUCT AND COMPUTER-READABLE STORAGE MEDIUM

FIELD OF THE INVENTION

The present invention relates to the field of audio apparatuses that provide contents such as music in a vehicle such as an automobile.

BACKGROUND OF THE INVENTION

In the field of an automobile, a typical example of vehicle, an audio apparatus has come into widespread use in recent years allowing passengers to enjoy various contents such as music in a vehicle.

In such a conventional audio apparatus, a passenger inserts a portable music storage medium such as a CD (compact disk), MD (mini-disk), cassette tape into the audio apparatus and enjoys music of his/her choice by replaying/outputting it from data stored in the music storage medium.

However, an audio apparatus using such a music storage medium is burdensome because the passenger needs to take the storage medium storing music to be replayed in the vehicle into the vehicle every time the passenger gets on the vehicle.

Thus, the Japanese Patent Laid-Open No. 11-30986, etc. proposes a technology for directly receiving digitized music data from the outside through an audio apparatus using a music distribution service and enjoying the music data in the vehicle without using a music recording medium.

Here, the technology described in the Japanese Patent Laid-Open No. 11-30986 will be summarized below.

The vehicle music data acquisition system described in this Publication consists of an information center that distributes music to vehicles and a vehicle capable of wirelessly communicating with the information center (see FIG. 2 of the relevant Publication) and the music distribution procedure in such a system configuration is explained with reference to FIG. 2 of the relevant Publication.

That is, the vehicle sends data about a music replaying condition in the own vehicle (including information to identify music of a distribution request) to the information center.

Upon reception of the data about the music replaying condition, the information center determines whether the requested music data exists in the information center or not and if the music data does not exist, the information center acquires the data on the Internet from the outside. Then, the information center creates music data with the amount of data reduced (compressed) based on the data about the music replaying condition and sends the music data created to the vehicle. The vehicle replays the music based on the received music data.

According to the audio apparatus using this music distribution service, the passenger can enjoy any music at any time without the need to prepare any music storage medium. This allows the passenger to easily enjoy music of his/her choice in the vehicle, providing an effect of allowing the passenger to spend his/her time comfortably in the vehicle.

Furthermore, the technology described in the Japanese Patent Laid-Open No. 10-240207 will be summarized below.

This Publication describes a touch-screen type audio-visual replay digital system and a plurality of windows appearing on a display shows information on audio-visual contents that can be replayed.

The user can select a desired window from among a plurality of windows displayed to easily replay the audio-visual contents requested to be replayed.

On the other hand, recently, with the development of the Internet, music distribution services indirectly using the Internet are provided as described above, which allows the user to download digitized contents data such as music to an information storage medium such as a memory card and enjoy music of his/her choice easily.

Furthermore, recently, individuals often carry with them portable audio apparatuses and these portable audio apparatuses are also making it easier to enjoy music using music data stored in an information storage medium.

By the way, people go for a long-distance drive on a trip, etc., a plurality of passengers often gets on the vehicle, in which case, because preference of music varies from one person to another, it is preferred that these passengers be able to enjoy music of their respective choices and spend their time during the long-distance drive comfortably.

In a vehicle equipped with an audio apparatus using a conventional music storage medium, satisfying such as demand requires each passenger to record music of his/her choice to a music storage medium corresponding to the audio apparatus or purchase one and take the music storage medium into the vehicle.

As in the case of the Japanese Patent Laid-Open No. 11-30986, the audio apparatus using the music distribution service provided from the information center can freely obtain a variety of music data at any time by a required amount. This allows the passengers to freely enjoy music of their choice without the need to take the music storage medium into the vehicle.

The audio apparatus using the music distribution service provides such convenience, but on the other hand, because this audio apparatus receives music data from the outside by radio (wireless telephone line, etc.), it takes some time of communication to download music data of one piece of music for example. Therefore, if, for example, electromagnetic interference occurs while the music data is being downloaded during a drive, the audio apparatus is unable to reliably receive the music data of the relevant piece of music.

And in the case where the music data cannot be received reliably, it is necessary to receive the music data again. Thus, even the audio apparatus using the music distribution service is still not sufficient in respect of user friendliness.

Moreover, downloading music data from the music distribution service in the current communication environment entails a high communication cost, and so it is problematic in respect of cost, too.

Therefore, one possible method of enjoying music of one's choice reliably and at low cost without using such a music distribution service is to use music data included in a portable audio apparatus. This is because the portable audio apparatus that each passenger carries includes music data of his/her choice beforehand and using this music data allows the passenger to reliably enjoy music data of his/her choice in the vehicle.

However, the shape and mode of a portable audio apparatus varies from one model to another, and the wired connection port and the shape of its information storage medium also vary. For this reason, using this portable audio apparatus in the vehicle requires the passenger to set the audio apparatus in a mount pre-installed in the vehicle, connect it to an in-car audio apparatus via a cable or insert or remove the information storage medium to take the music data of portable audio apparatuses of all models into the in-car audio apparatus, which is difficult in practice.

Moreover, even if wired connection ports of portable audio apparatuses of all models and information storage media are standardized having a common shape and mode, there remains a possibility that the passenger will still need to set the audio apparatus in the mount and insert or remove the information storage media, which is a problem of requiring time and trouble.

SUMMARY OF THE INVENTION

The present invention has been proposed to solve the conventional problems, and has as its main object to provide, when a plurality of passengers get on an automobile, for example, an audio system and its contents reproduction method, audio apparatus for a vehicle and its contents reproduction method, computer program product and computer-readable storage medium capable of easily and reliably replay contents data in a portable audio apparatus carried by passengers inside the vehicle and outputs the contents data as sound so that passengers can enjoy music of their respective choices in the vehicle without the need to download contents data such as music and conversation from the Internet.

To solve the above problems, the present invention is constituted as follows.

That is, the present invention provides an audio system that reproduces contents information as sound in a vehicle, composed of a portable audio apparatus (200, 200a, 200b) carried by a passenger of the vehicle and an audio apparatus (100) mounted in the vehicle, characterized in that the portable audio apparatus includes contents information retaining means (204) for retaining contents information and transmitting means (205) for transmitting the content information to the audio apparatus at least by means of a radio communication, and the audio apparatus includes receiving means (110) for receiving the contents information from the portable audio apparatus at least by means of a radio communication, storing means (102) for storing the contents information received by the receiving means and controlling means (101, 103) for reproducing the contents information stored in the storing means and outputting the reproduced information as sound from speakers(28) mounted in the vehicle.

Another system configuration to attain the same object is an audio system that reproduces contents information as sound in a vehicle, composed of a portable audio apparatus (200, 200a, 200b) carried by a passenger of the vehicle and an audio apparatus (100) mounted in the vehicle, characterized in that the portable audio apparatuses include contents information retaining means (204) for retaining contents information and its title information associated with each other, title information sending means (203, 205) for sending title information associated with the contents information to the audio apparatus at least by means of a radio communication and contents information sending means (203, 205) for sending the content information corresponding to the title information received from the audio apparatus to the audio apparatus at least by means of a radio communication, and the audio apparatus includes title information receiving means (110) for receiving the title information from the portable audio apparatus at least by means of a radio communication, storing means (102) for storing the title information received by the title information receiving means, selecting means (24, 106 to 109) for informing titles in the vehicle according to the title information stored in the storing means and allowing the passenger in the vehicle to select contents information to be received from the portable audio apparatus with reference to the informed titles, request sending means (110) for sending the title information corresponding to the title selected by the selecting means to the portable audio apparatus at least by means of a radio communication in order to request the contents information corresponding to the selected title to be sent and controlling means (101, 103) for receiving the contents information corresponding to the selected title from the portable audio apparatus at least by means of a radio communication and reproducing the received contents information and outputting the reproduced information as sound from speakers (28) mounted in the vehicle.

In a preferred embodiment, the audio apparatus identifies the portable audio apparatus that exists in a predetermined radio communication area of the audio apparatus and further includes system constructing means (101 and 110) for constructing a radio communication system made up of the identified portable audio apparatus and the audio apparatus, it is desirable that the audio apparatus acquire the contents information from the portable audio apparatus identified by the system constructing means.

In this case, it is desirable that upon reception of a plurality of pieces of contents information from a plurality of portable audio apparatuses identified by the system constructing means, the audio apparatus be further provided with instructing means capable of instructing simultaneous reproduction of the plurality of pieces of contents information, and when simultaneous reproduction is instructed by the instructing means, the controlling means output at least one piece of contents information from among the plurality of pieces of contents information instructed to be reproduced simultaneously from the speakers and remotely control the plurality of portable audio apparatuses so that the remaining pieces of contents information be reproduced by at least one of the plurality of portable audio apparatuses identified by the system constructing means.

To attain the same object, the present invention provides a contents reproduction method for an audio system that reproduces contents information as sound in the vehicle, comprising a system constructing step of constructing a communication system that carries out at least a radio communication, composed of portable audio apparatus (200, 200a, 200b) carried by a passenger of the vehicle and an audio apparatus (100) mounted in the vehicle, a contents information sending step of sending contents information retained beforehand in the portable audio apparatus to the audio apparatus at least by means of a radio communication, an information storing step of storing the contents information acquired in the contents information sending step in a storing medium (102) of the audio apparatus and a sound reproducing step of reproducing the contents information stored in the storage medium and outputting the reproduced information as sound from speakers (28) mounted in the vehicle.

Another method to attain the same object is a contents reproduction method for an audio system that reproduces contents information as sound in the vehicle, comprising a system constructing step of constructing a communication system that carries out at least a radio communication, composed of a portable audio apparatus (200, 200a, 200b) carried by a passenger of the vehicle and an audio apparatus (100) mounted in the vehicle, title information sending step of sending the title information of the contents information and title information retained associated beforehand with the portable audio apparatus to the audio apparatus at least by means of radio communication, information storing step of storing the title information acquired in the title information sending step in a storage medium (102) of the audio apparatus, a selecting step of informing titles in the vehicle according to the title information stored in the storage medium and allowing the passenger in the vehicle to select contents information to be received from the portable audio apparatus with reference to the informed titles, a request sending step of sending the title information corresponding to the titles selected in the selecting means to the portable audio apparatuses at least by means of a radio communication in order to request the transmission of the contents information corresponding to the selected titles, a contents information sending step of sending contents information corresponding to the title information received from the audio apparatus to the audio apparatus at least by means of a radio communication and a sound reproducing step of receiving the contents information corresponding to the selected title from the portable audio apparatus at least by means of a radio communication, reproducing the received contents information and outputting the reproduced information as sound from speakers (28) mounted in the vehicle.

Another method to attain the same object is a contents reproduction method for an audio system that reproduces contents information as sound in the vehicle, comprising a system constructing step of constructing a communication system that carries out at least a radio communication, composed of a portable audio apparatus (200, 200a, 200b) carried by a passenger of the vehicle and an audio apparatus (100) mounted in the vehicle, a contents information sending step of sending contents information retained beforehand in the audio apparatus to the portable audio apparatus at least by means of a radio-communication and a sound reproducing step of receiving the contents information sent in the contents information sending step by the portable audio apparatus at least by means of a radio communication, reproducing the received contents information and outputting the reproduced information as sound from the portable audio apparatus.

Another method to attain the same object is a contents reproduction method for an audio system that reproduces contents information as sound in the vehicle, comprising a system constructing step of constructing a communication system that carries out at least a radio communication, composed of a plurality of portable audio apparatuses (200, 200a, 200b) carried by passengers of the vehicle and an audio apparatus (100) mounted in the vehicle, a contents information sending step of sending contents information retained beforehand in a first portable audio apparatus to a second portable audio apparatus according to a control signal from the audio apparatus at least by means of a radio communication and a sound reproducing step of receiving the contents information sent in the contents information sending step by the second portable audio apparatus at least by means of a radio communication, reproducing the received contents information and outputting the reproduced information as sound from the second portable audio apparatus.

The same object above can also be attained by an audio apparatus mounted in a vehicle (audio apparatus for a vehicle), program codes that instruct so that the operation of the audio apparatus is implement and a computer-readable storage medium that stores these program codes, which make up the audio system in the above configuration.

The same object above can also be attained by a contents reproduction method of the audio apparatus (audio apparatus for a vehicle) corresponding to the contents reproduction method of the audio system in the configuration above, program codes that instruct so that the contents reproduction method is implemented in the audio apparatus for a vehicle and a computer-readable storage medium that stores these program codes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Embodiments of the present invention applied to an automobile, a typical example of vehicle, will now be described in detail in accordance with the accompanying drawings.

Figure 1:
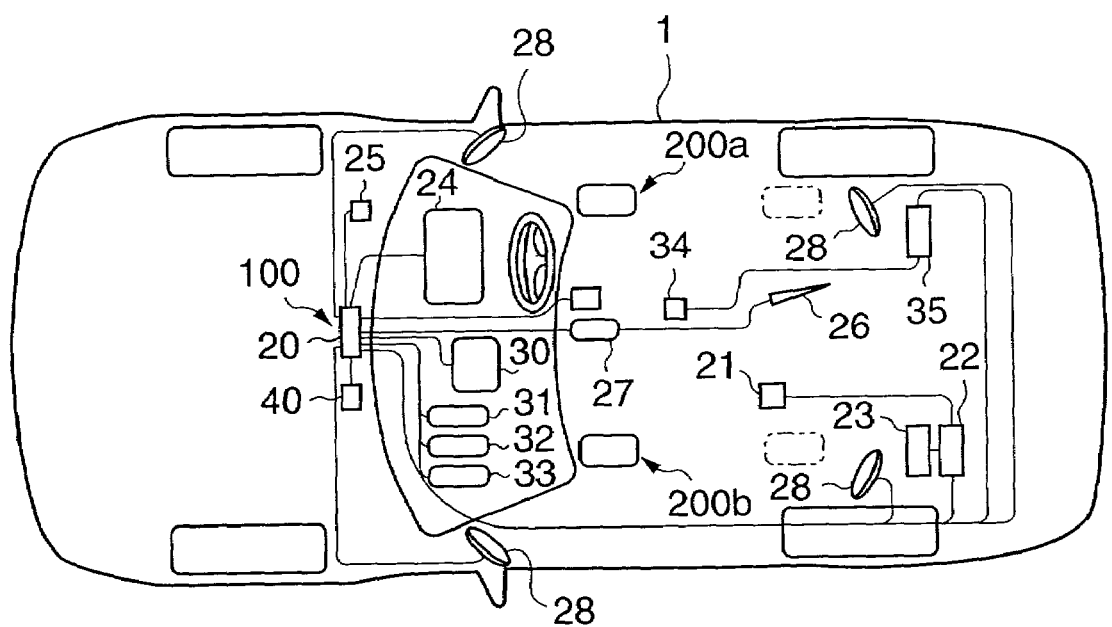
FIG. 1 is an outlined plan view of au automobile using an audio apparatus of the present invention.

FIG. 1 is an outlined plan view of au automobile using an audio apparatus (audio system) of the present invention. As shown in FIG. 1, the automobile audio apparatus of this embodiment is generally constituted by a car-mounted audio apparatus 100 (hereinafter referred to as "audio apparatus 100") mounted in a vehicle 1 and portable audio apparatuses 200a and 200b carried into the vehicle by passengers.

In the following explanations, the portable audio apparatuses 200a and 200b will sometimes be collectively called a "portable audio apparatus 200".

The audio apparatus 100 is constructed of not only an audio function but also a navigation function and Internet communication function, etc. so as to perform a variety of information processing.

A concentrated control unit 20 for controlling the entire system of the audio apparatus of this embodiment is installed close to an instrument panel in the center of the vehicle 1. This concentrated control unit 20 is connected with various apparatuses mounted in the vehicle 1 in order to perform the functions, which will be described below.

(Navigation Function)

The navigation function is intended to realize navigation functions such as route guidance to a preset desired destination and is constructed by a GPS (Global Positioning System) antenna 21 to detect the current position of the own vehicle installed in the vehicle 1, a navigation controller 22 to perform navigation control, a DVD-ROM changer 23 to read road map information, etc. stored in DVD-ROM, a display 24 that displays navigation information and allows input operations by passengers and a voice guide speaker 25 that outputs navigation information in voice, and these apparatuses are each connected to the concentrated control unit 20.

The navigation function in this embodiment is provided with functions similar to those of a conventional navigation apparatus such as detecting the current position of the own vehicle, giving the passengers road information and traffic information and providing a route guide for the automobile.

(Internet Communication Function)

The Internet communication function is constructed by a telephone antenna 26 connected to the Internet over a radio telephone network, a cellular telephone 27 to transmit/receive Internet information, the display 24 that allows input operations by the passenger, car-mounted speakers 28 that output the information received on the Internet as voice information (hereinafter referred to as "speakers 28"), etc. and these apparatuses are also each connected to the concentrated control unit 20.

This embodiment transmits/receives Internet information using the cellular telephone 27, but it is also possible to provide a dedicated Internet transmission/reception section for the main unit of the audio apparatus 100 aside from the cellular telephone 27.

The Internet communication function of this embodiment is provided with functions such as receiving various kinds of information requested by the passengers by the audio apparatus 100 over the Internet and transmitting information from the vehicle to the outside by e-mail, etc.

(Audio Function)

The audio function is constructed by an audio control unit 30 that controls the entire system of the relevant audio function, a CD drive 31 that reads CD music data, an MD drive 32 that reads MD music data, a memory drive 33 that reads music data of a memory card, speakers 28 that output music as sound in the vehicle, a car-mounted radio antenna 34 placed in the center of the vehicle to carry out radio communication with a plurality of cellular audio apparatuses 200a and 200b in the vehicle and a radio transmitter/receiver 35 that transmits/receives music data to/from the portable audio apparatuses 200a and 200b, and these apparatuses are each connected to the concentrated control unit 20.

As in the case of a conventional audio apparatus, this audio function is provided with functions such as reading contents data such as music, converted to digital data, stored in a CD, MD or memory card (hereinafter referred to as "music data"), generating reproduction signals according to the read music data and outputting the music data from the speakers 28 as music (hereinafter referred to as "reproduced output"), and also provided with a function of receiving AM/FM waves by an AM/FM tuner (not shown) and outputting AM/FM broadcasting signals from the speakers 28.

This audio function is also provided with a function of receiving digital music data using a music distribution service of the Internet and reproducing and outputting as music from the speakers 28.

The audio function of the audio apparatus 100 is further capable of communicating with a plurality of the portable audio apparatuses 200a and 200b carried into the vehicle through in-car radio communications based on a predetermined communication system and provided with a function of receiving music data retained in the portable audio apparatuses 200a and 200b and reproducing and outputting as music from the speakers 28 in the vehicle.

Note, the concentrated control unit 20 to which these apparatuses are connected is connected to a car-mounted LAN (local area network) unit 40 as shown in FIG. 1 and is constructed so as to perform information communication with other vehicle control apparatuses.

Next, the control system and radio communication system of the audio apparatus according to this embodiment will be explained with reference to the system block diagram in FIG. 2.

Figure 2:
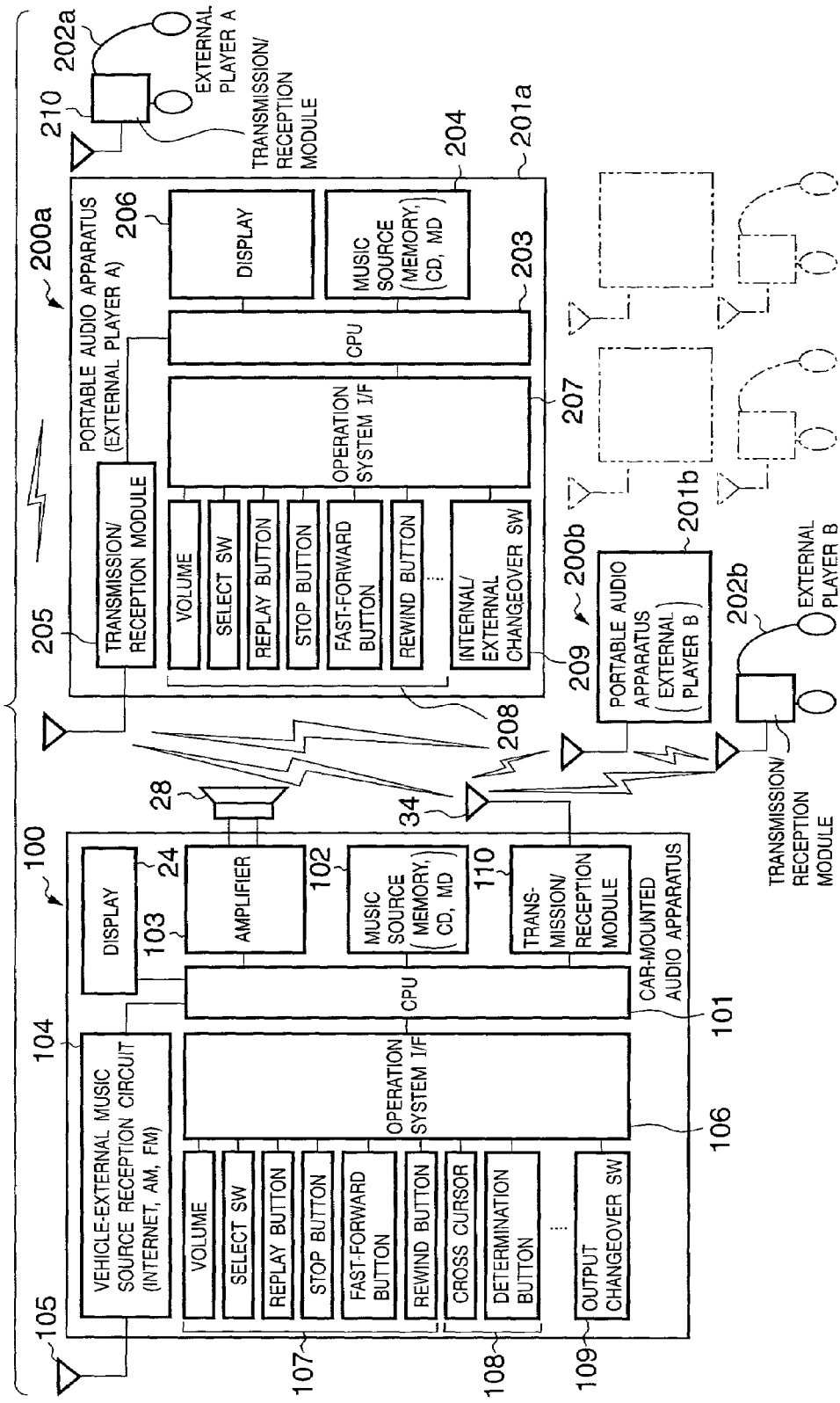
FIG. 2 is a system block diagram of a control system and radio communication system of an audio apparatus according to an embodiment of the present invention.

In FIG. 2, a system block of the audio apparatus 100 is shown on the left side and a system block of the portable audio apparatus 200a is shown on the right side. FIG. 2 shows details of only the system block of one portable audio apparatus for convenience, but the system of the other portable audio apparatus is also constructed in the same way.

The audio apparatus 100 is provided with a CPU 101 and this CPU 101 controls the system of the audio apparatus 100. A music source 102 is connected to the CPU 101. The music source 102 is constructed of an information storage unit (e.g., storage medium such as semiconductor memory) that stores music data received from the outside and retains music data of the audio apparatus 100.

Furthermore, an amplifier 103 is connected to the CPU 101 and the amplifier 103 amplifies and converts music information signals which are music data stored in a storage medium reproduced and generated by the CD drive 32, etc. and reproduces and outputs as music from the speakers 28.

Furthermore, the display 24 is connected to the CPU 101 of the audio apparatus 100 and the display 24 displays the control content of the audio apparatus 100 and music source music title data, etc. Furthermore, a car external music source reception circuit 104 is connected to the CPU 101 and the car external music source reception circuit 104 receives information from the Internet and AM or FM waves through a car-external antenna 105 (telephone antenna 26, etc.).

Furthermore, audio operation switches 107 such as a volume, a select switch, a replay button, a stop button, a fast-forward button, a rewind button and a selecting/determining switch 108 to select a cross cursor button or select button and an output changeover button 109 are connected to the CPU 101 via an operation system interface 106.

Furthermore, a transmission/reception module 110 is connected to the CPU 101 and the transmission/reception module 110 carries out in-car radio communication with the portable audio apparatuses 200a and 200b carried into the vehicle via an in-car radio antenna 34.

The portable audio apparatus 200a is constructed of an apparatus main unit 201a and a headphone 202b.

This apparatus main unit 201a is provided with a CPU 203 that controls the system of the portable audio apparatus 200a, and a music source 204, a transmission/reception module 205, a display 206, operation switches 208 such as a volume, a select switch, a replay button, a stop button, a fast-forward button and a rewind button, etc. and internal/external changeover switch 209 are further connected to this CPU 203 via an operation system interface 207.

The headphone 202a of the portable audio apparatus 201a is also provided with a transmission/reception module 210 for radio communications, which receives music data sent from the apparatus main unit 200a of the portable audio apparatus through radio communication to allow the passengers to enjoy music individually.

Note, the number of portable audio apparatuses in this embodiment is only set to 2, but it is also possible to additionally set the number according to the number of passengers as shown with virtual lines in FIG. 2.

These audio apparatus 100 and portable audio apparatuses 200a and 200b transmit/receive music data, etc. to/from each other through in-car radio communication.

As an in-car radio communication system, this embodiment adopts a short-distance data communication system that slows the apparatuses to recognize and authenticate one another in the vehicle and perform data communication among one another. More specifically, as an example of a short-distance data communication system used within a short-distance of several tens of m, this embodiment carries out a so-called Bluetooth-based radio communication.

The short-distance communication system includes radio wave communication using a spread spectrum technology, optical communication and infrared communication, etc. This embodiment adopts a radio wave communication with less directivity. However, if it is possible to construct a network in which the music apparatus 100 functions as a master and the portable music apparatuses function as slaves during a communication, other communication systems can also be adopted.

Furthermore, music data transmitted/received is preferred to be compatible to all kinds of model and transmitted/received in a short time, and therefore this music data is preferred to be transmitted/received, after being compressed as a data file based on a predetermined system and converted to compressed data.

Data compression systems available to this embodiment include MP3, Solid Audio, Liquid Audio, etc. Therefore, the audio apparatus 100 and portable audio apparatuses 200 are provided with general software or hardware capable of compressing to music data based on such a data compression system or decoding to a decoded signal at the time of reproduction.

Connecting the audio apparatus 100 and portable audio apparatus 200 through in-car radio communication and constructing a communication network (hereinafter referred to as "network") will allow each apparatus to transmit/receive music data and allow the audio apparatus 100 to control the portable audio apparatuses 200, etc.

Figure 3:
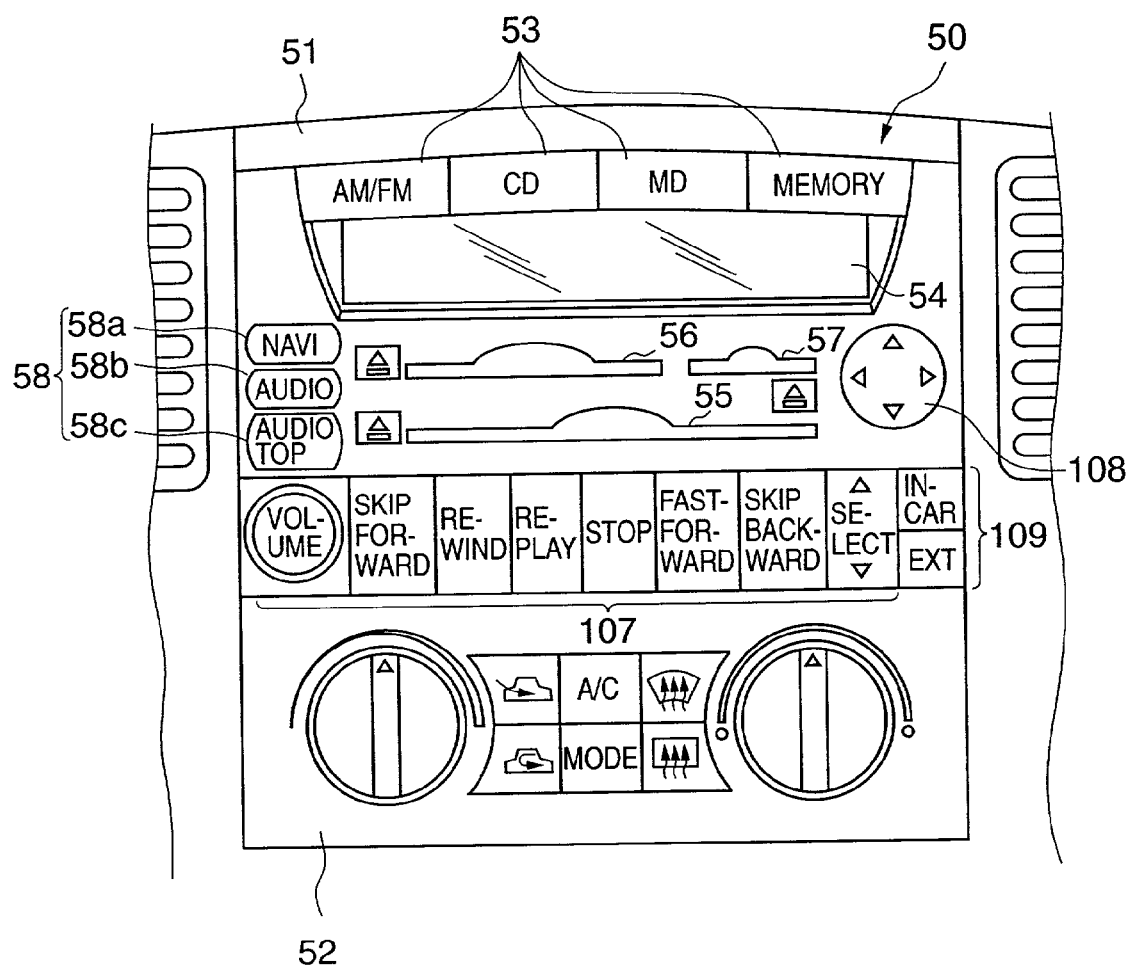
FIG. 3 is a front view of an operation panel of an audio apparatus 100 in this embodiment.

FIG. 3 is a front view of an operation panel 50 of the audio apparatus 100 installed in the center of the instrument panel. The upper section is an operation panel 51 of the audio apparatus and the lower section is an air-conditioning-related operation panel 52. Here, the audio-apparatus-related operation panel 51 will be explained.

First, selection switches 53 for selecting a music source such as AM/FM and CD, etc. are provided in the upper section of the operation panel 50 and the music source output from the speakers 28 is determined according to the selection of these selection switches 53.

Below the selection switches 53 is a liquid crystal display panel 54. The liquid crystal display 54 displays a set temperature and in-car temperature or music information of the audio apparatus 100, etc.

Below the liquid crystal display 54 are slot openings 55, 56 and 57. Inserting various storage media such as a CD, MD or memory card into these slot openings 55, 56 and 57 allows the audio apparatus 100 to incorporate music data of music sources.

To the left of the slot openings 55 and 56 are screen changeover switches 58 to switch the display screen of the liquid crystal display 54. At the top is a navigation switch 58a to switch the display screen to a navigation screen, in the center is an audio switch 58b to switch the display screen to an audio screen and at the bottom is an audio top switch 58c to switch the display screen to an audio top menu screen of in-car radio communication.

The display 24 of the audio apparatus 100 is set on an instrument panel (not shown) close to a driver seat easily recognizable by the passengers and constructed to display an audio screen such as various kinds of information of the audio apparatus. Note, that the above-described liquid crystal display panel 54 can also be used as the display 24 of the audio apparatus 100.

To the right of the slot openings is a cross cursor/determination button 108 to move the cursor on a display screen and determine a predetermined item.

Below the slot openings are audio operation switches 107 whereby the passengers can input audio operation signals such as replay, stop or volume. These audio operation switches 107 are a power volume switch, skip switch, etc. from the left. At the right end are output changeover switches 109 that allow the passenger to switch the output destination of the audio operation signal which is output by the passenger manipulating the audio operation switches 107 between the audio apparatus 100 and portable audio apparatuses 200.

Then, the action and method of operation of the audio apparatus according to this embodiment will be explained using FIG. 4 to FIG. 12.

First, the action of the audio apparatus 100 will be explained using the flow chart of operation control of the audio apparatus 100 shown in FIG. 4. This flow chart indicates the procedure of a software program executed by the CPU 101 and the control processing by the CPU 101 is started by an ignition ON of the vehicle 1, for example.

Initially, it is judged whether a power switch of the audio apparatus 100 (not shown) is ON or not (S10) and when the judgment result is NO, the process goes to Return and when the judgment result is YES, it is judged whether an external music source (each of the portable audio apparatuses 200) is replayed or not (S11).

If the result of the judgment (S11) as to whether the external music sources 200a and 200b are replayed or not is NO, music data of the music source 102 (CD, MD, memory card, etc.) of the audio apparatus 100 is directly reproduced and output from the speakers 28 as in the case of a normal audio apparatus (S12). On the other hand, if the judgment result is YES, the existence of any external music source (apparatus main units 201a and 201b of the portable audio apparatuses) and external speakers (headphones 202a and 202b of the portable audio apparatuses) carried into the vehicle is searched, and the external music source whose existence has been confirmed is connected to the audio apparatus 100 through an in-car radio communication (S13).

The search connection operation in S13 is started by the passenger operating the audio top switch 58c on the operation panel 51 of the audio apparatus 100. More specifically, the passenger makes an "AUDIO TOP MENU" shown in FIG. 5 appear on the display screen and selects and determines "External music source/external speaker search and reception" D2 with a cross cursor/determination button 108.

Figure 6:
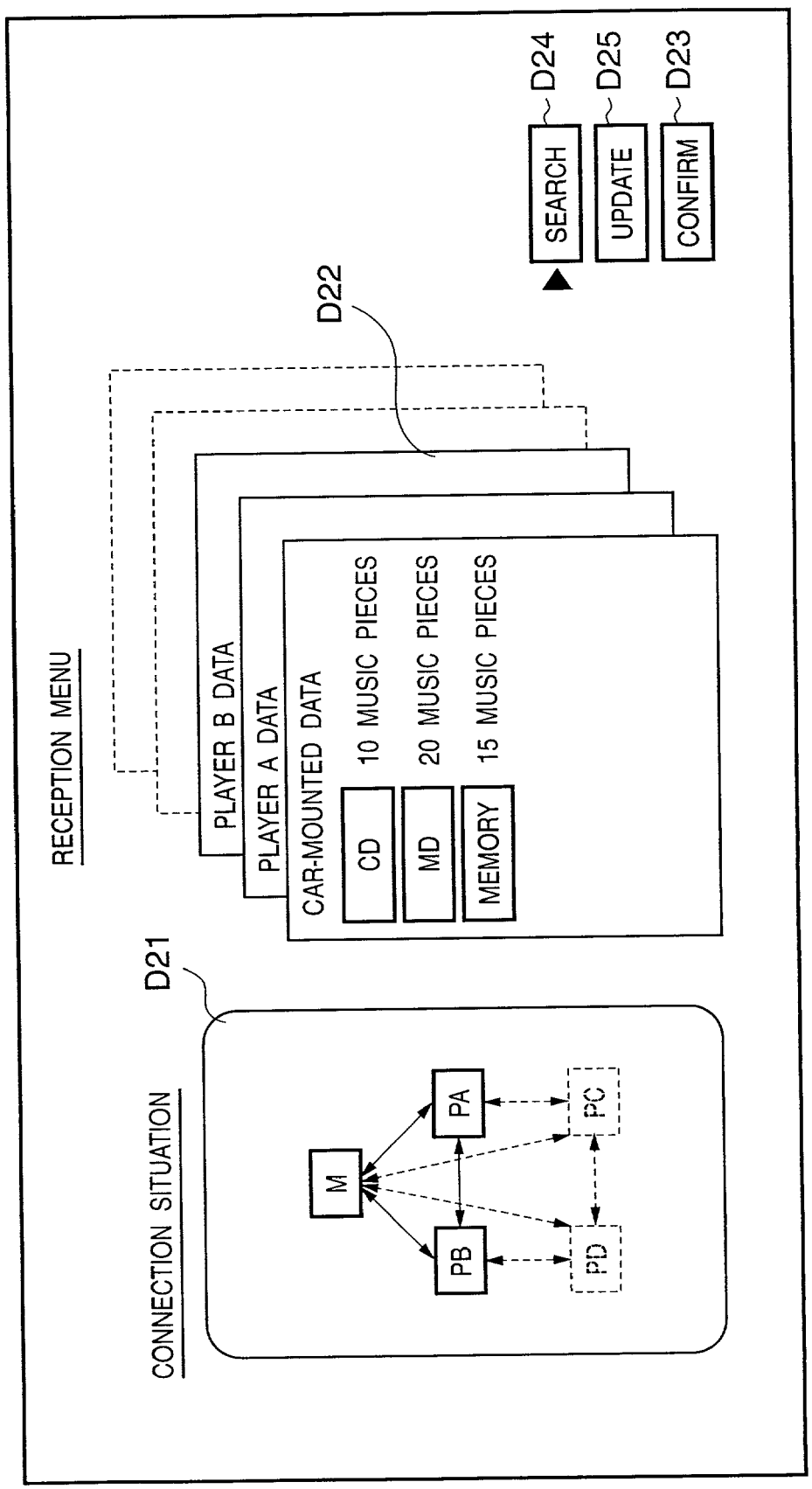
FIG. 6 is an "reception MENU" screen shown on a display in this embodiment.

In this case, if the passenger selects/determines "External music source/external speaker search and reception" D2, the display screen is switched to the "Reception MENU" screen shown in FIG. 6 and a search radio wave is emitted from the in-car radio antenna 34 of the audio apparatus 100. This allows the audio apparatus 100 to connect the apparatuses 201a and 201b of the portable audio apparatuses in the vehicle to the headphones 202a and 202b for a search.

At this time, installed in the center of the vehicle, the in-car radio antenna 34 can emit the search radio wave uniformly in the vehicle and detect the portable audio apparatuses 200 in the vehicle uniformly. Furthermore, even if portable audio apparatuses 200 owned by persons other than the passengers happen to exist outside near the vehicle, this reduces the probability of an erroneous search.

When the portable audio apparatuses 200a and 200b are detected and connected within a predetermined search time, the audio apparatus 100 and the plurality of portable audio apparatuses 200a and 200b send an identification address to each other and form a network through an in-car radio communication. Once the network is constructed, the "Reception MENU" screen looks as shown in FIG. 6.

For example, when the audio apparatus 100 finds and recognizes two portable audio apparatuses 200a and 200b in the vehicle, these apparatuses construct a communication system with the audio apparatus 100 as a master and the portable audio apparatuses 200a and 200b as slaves and recognize one portable audio apparatus 200a as an external player A and the other portable audio apparatus 200b as an external player B. Then, the "Reception MENU" screen shows the connection states in simplified expressions indicating the audio apparatus 100 as M and the portable audio apparatuses as PA and PB (D21). Note, that the "Reception MENU" screen also shows a list of music title data, etc. associated (correspondence established) with music data (contents data) of each apparatus connected (D22).

When the apparatuses have constructed the network by means of in-car radio communication, the passenger operates the cross cursor/determination button 108 to select/determine "Confirm" D23 on the "Reception MENU" screen and terminates the search connection operation.

However, if it is judged that the search/connection is insufficient, the passenger operates the cross cursor/determination button 108 to select/determine "Search" D24 to continue the search/connection. This ensures that the apparatuses are connected to construct the network.

Note, if the number of the portable audio apparatuses 200 in the vehicle changes, it is necessary to perform search/connection every time, but if the passenger selects/determines "Update" D25 on the "Reception MENU" screen, it is possible to set the audio apparatus 100 so as to automatically repeat search/connection at predetermined intervals.

After external music sources (apparatus main units of the portable audio apparatuses), external speakers (headphones) have been searched/connected (S13), a music source and output port are determined on the "AUDIO MENU" screen (S14).

Figure 7:
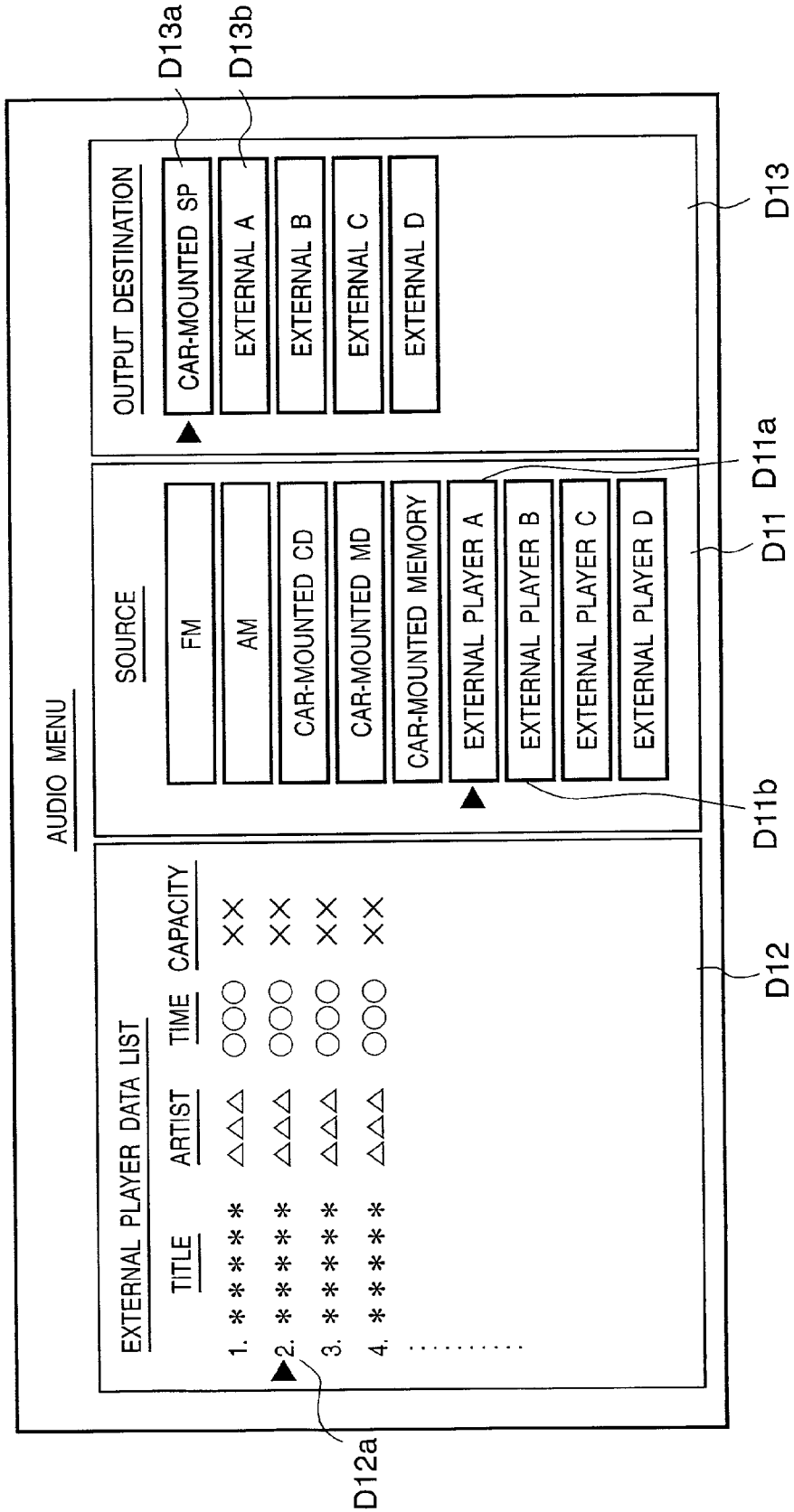
FIG. 7 is an "AUDIO MENU" screen shown on a display in this embodiment.

The music source/output port determination operation in S14 is carried out by the passenger operating the cross cursor/determination button 108 on the "AUDIO TOP MENU" screen to select/determine "Determine music replay/output destination" D1 and making the display screen show the "AUDIO MENU" screen shown in FIG. 7.

Here, the music source/output port determination operation in S14 will be explained more specifically. For example, if the passenger wants to replay the second music of the portable audio apparatus 200a identified as the external player A from the speakers 28, the passenger selects/determines "External player A" D11a in the "Source" selection area D11 on the "AUDIO MENU" screen. Then, a music data list D12 of the portable audio apparatus 200a of the external player A is displayed on the left. This music data list D12 shows music titles, artist names and data volumes, etc. and shows the content of the music data retained in the portable audio apparatus 200a.

The passenger operates the cross cursor/determination button 108 in this music data list D12 displayed to select/determine the "Second music" D12a. Then, the passenger selects/determines "Car-mounted SP" D13a in the "Output destination" selection area D13 (selection/determination content in FIG. 7).

When the passenger who carries the portable audio apparatus 200a of the external player A personally wants to replay all music pieces of the music data of the portable audio apparatus 200b of the external player B carried by another passenger through the own headphone, the passenger selects/determines "External player B" D11b in the "Source" selection area D11 on the "AUDIO MENU" screen and makes the music data list (not shown) of the portable audio apparatus 200b of the external player B appear and selects/determines the "External player B" D11b in the "Source" selection area D11 again. Thus, the passenger selects all music pieces of the portable audio apparatus 200b of the external player B and then selects/determines the "External player A" D13b in the "Output destination" selection area D13.

Thus, the passenger further performs operation of determining a music source, output port according to the request of a passenger and terminates the music source/output port determination operation.

The music source/output port determination operation according to the request of each passenger is performed in this way.

After the passenger determines the music source/output port on the "AUDIO MENU" screen, it is judged whether the selected music source is only a car-mounted source (music source of the audio apparatus 100) or not (S15).

If the judgment result in S15 is YES, it is judged whether the output destination is only the speakers 28 or not (S16).

On the other hand, if the judgment result in S15 is NO, the music data of the music selected from external music sources (portable audio apparatuses 200a and 200b) is received and the received music data is stored in an information storage unit (not shown) such as a semiconductor memory of the audio apparatus (S17). Then, it is judged whether the output destination set in S14 is the speakers 28 only or not (S16).

That is, if the external music sources (portable audio apparatuses 200a and 200b) are selected in the "Source" selection area D11, the music data sent from the portable audio apparatuses 200a and 200b are received by the audio apparatus 100 and then temporarily stored in the information storage unit and taken out from the information storage unit again when the music data is reproduced and output.

Therefore, when the above described selection is made, the music data of the 2nd music is sent from the portable audio apparatus 200a of the external player A and the music data is received by the audio apparatus 100, temporarily stored in the information storage unit of the audio apparatus 100 and the music data of the 2nd music of the portable audio apparatus 200a is taken out from the information storage unit of the audio apparatus 100 when the music data is reproduced and output.

Note, if the external music sources (portable audio apparatuses 200a and 200b) are selected consecutively, the process is repeatedly controlled so that while the previously received music data is being reproduced and output by the speakers 28, the next music data is received and stored in the information storage unit of the audio apparatus 100.

Then, if the result of judgment in S16 as to whether the selected output destination is only the speakers 28 or not is YES, the-selected music is reproduced and output from the speakers 28 (S18). On the other hand, if the judgment result is NO, it is further judged whether the output destination is the speakers 28 and external speakers (headphones 202a, 202b) or not (S19).

If the judgment result in S19 is YES, the selected music (music previously selected by the passenger to be replayed) to be output from the speakers 28 is reproduced and output from the speakers 28 and the selected music to be output from the external speakers is sent to the selected external speakers (headphones 202a, 202b) (S20).

Thus, if the two output destinations of the music data, the speakers 28 and external player A, are selected/determined, the speakers 28 reproduce and output the music data of the portable audio apparatus 200a of the external player A and the headphone 202a of the external player A reproduces and outputs the music data of the portable audio apparatus 200a of the external player B, allowing the speakers 28 and headphone 202 to replay different pieces of music simultaneously.

In this case, the music data of the portable audio apparatus 200b of the external player B may be temporarily stored in the information storage unit of the audio apparatus 100 and sent to the headphone 202a of the external player A, or may be sent directly to the headphone 202a of the external player A from the portable audio apparatus 200b of the external player B by bypassing the audio apparatus 100.

If the judgment result in S19 is NO, that is, if the output destination is only the external speakers, the music data of the selected music is sent to the selected external speakers (headphones 202a and 202b of the portable audio apparatuses) (S21).

Then, in the above control state, it is judged whether the passenger has operated the audio operation switch 107 or not (S22). If the audio operation switch 107 has been operated, an audio operation signal corresponding to the operation is output from the relevant switch.

If the judgment result in S22 is YES, an audio operation signal is output to the corresponding apparatuses according to the output changeover switch 109 that switches the output destination of the audio operation signal (S23).

Thus, when the passenger operates the fast-forward switch, if the audio apparatus 100 has been selected by the output changeover switch 109, the music reproduced and output from the speakers 28 is fast-forwarded. On the other hand, if the portable audio apparatus 200a of the external player A has been selected by the output changeover switch 109, the music reproduced and output from the headphone 202a of the portable audio apparatus is fast-forwarded.

If the judgment result in S22 is NO, that is, if the passenger has not operated the audio operation switches 107, the process directly shifts to Return.

Communication control and audio control of the audio apparatus 100 are carried out in this way.

Figure 8:
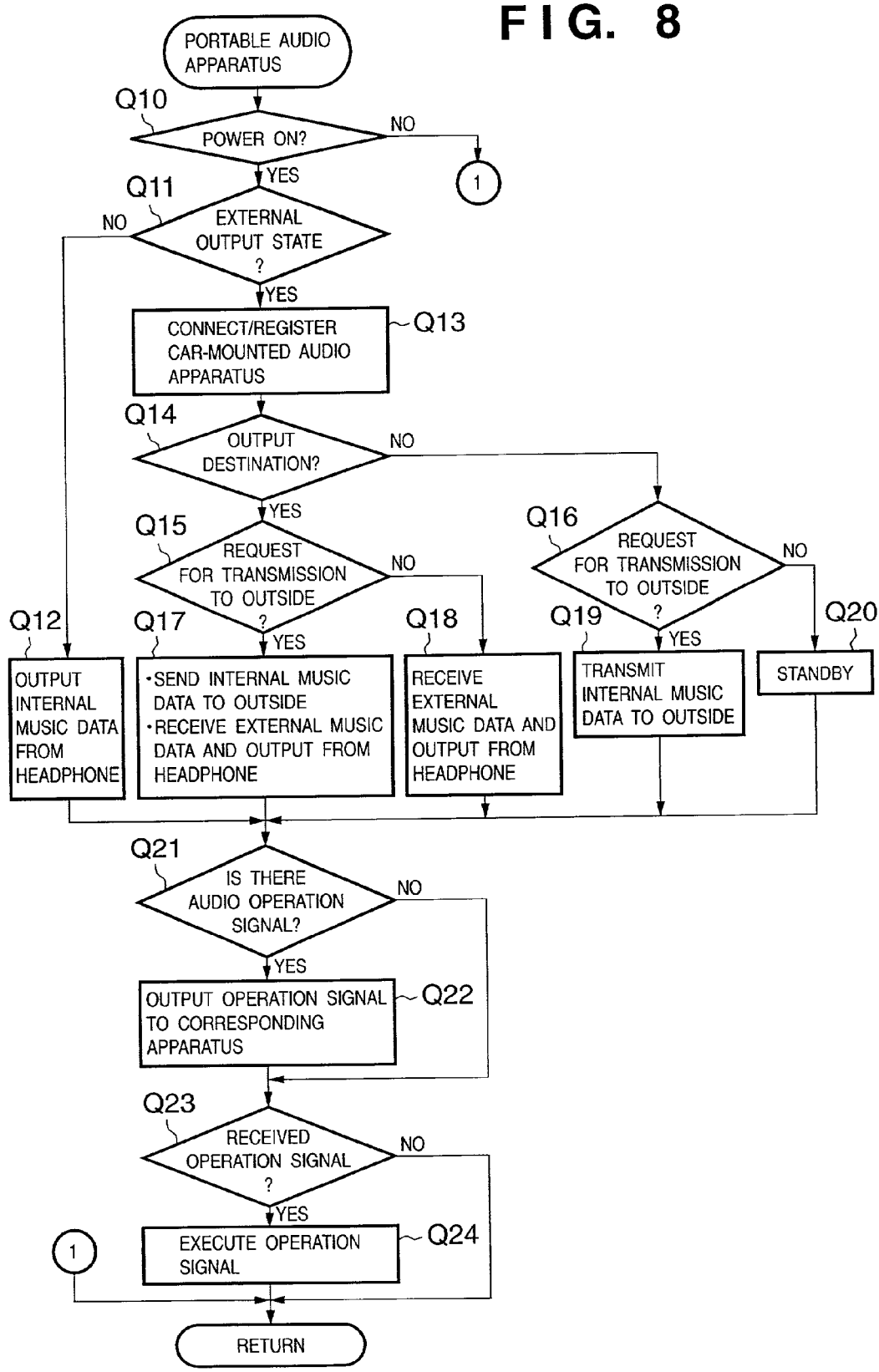
FIG. 8 is a flow chart of operation control of a portable audio apparatus 200 in this embodiment.

Then, the operation of the portable audio apparatus 200 will be explained using the flow chart of operation control of the portable audio apparatus 200 shown in FIG. 8. This flow chart indicates the procedure of a software program executed by the CPU 203.

Here, the portable audio apparatus 200a, which is the external player A, will be explained, but the other portable audio apparatus will be operated in the same way.

First, it is judged whether the power of the portable audio apparatus 200a is ON or not (Q10) and if the judgment result is NO, the process shifts to Return and if the judgment result is YES, it is judged whether the internal/external changeover switch 209 of the portable audio apparatus 200a is in an external output state or not (Q11).

If the result of the judgment about the external output state is NO, the music data (hereinafter referred to as "internal music data") of the music sources 204 (CD, MD, memory card, etc.) of the portable audio apparatus is output/reproduced from the headphone 202a as in the case of a normal portable audio apparatus (Q12).

On the other hand, the judgment result in Q11 is YES, the relevant portable audio apparatus 200 is connected and registered in the audio apparatus 100 in accordance with the aforementioned search/connection operation of the audio apparatus 100 (Q13). Thus, the portable audio apparatus 200a constitutes a network together with other apparatuses (audio apparatus 100, portable audio apparatus 200b) via in-car radio communication.

When the relevant portable audio apparatus 200 is connected to and registered in the audio apparatus 100, then it is judged whether the own portable audio apparatus 200a is selected by the passenger as the output destination through the selection signal received by the audio apparatus 100 (Q14).

Then, whether the judgment result in Q14 is YES or NO, it is judged whether there is any request for sending internal music data to the external apparatuses (audio apparatus 100 or other portable audio apparatus 200b) (Q15, Q16).

When it is judged that the own portable audio apparatus 200a is the output destination and there is a request for sending internal music data to the audio apparatus 100 or other portable audio apparatus 200b (hereinafter referred to as "external apparatuses"), the internal music data is sent to the external apparatuses and at the same time, the music data of the external apparatuses (hereinafter referred to as "external music data") and reproduced/output from the headphone 202a of the portable audio apparatus (Q17).

Thus, if, for example, the music source/output port is selected/determined on the "AUDIO MENU" screen as shown above, the music data retained in the portable audio apparatus 200a of the external player A is sent to the audio apparatus 100 and the passenger can replay the music data in the vehicle and at the same time, the headphone 202a of the external player A receives the music data retained in the portable audio apparatus 202b of the external player B and the passenger can personally replay the music data.

On the other hand, if it is judged in Q14 and Q15 that the own portable audio apparatus 200a is the output destination and there is no request for sending internal music data to the external apparatuses, the external music data is received and the headphone 202a reproduces and outputs the music data (Q18).

Thus, in this case, the passenger can receive the music data of the audio apparatus 100 or music data of the other portable audio apparatus 200b and personally enjoy the music data by the headphone 202a without sending the music data from the own portable audio apparatus 200a to the external apparatuses.

On the other hand, if it is judged in Q14 and Q16 that the own portable audio apparatus 200a is not the output destination and there is a request for sending internal music data to the external apparatuses, the internal music data is sent to the external apparatuses (Q19).

Thus, in this case, no music is reproduced/output from the headphone 202a and it is not possible to personally enjoy music but it is possible to send the music data to the audio apparatus 100 or other portable audio apparatus 200b and enjoy the music data retained in the own portable audio apparatus 200a using the speakers 28 or the headphones 202b of the other portable audio apparatuses.

Furthermore, if it is judged in Q14 and Q16 that the own portable audio apparatus 200a is not the output destination and there is no request for sending internal music data to the external apparatuses, either, then the internal music data and external music data are not transmitted/received and the portable audio apparatus 200a is held in a standby state (Q20).

In this case, the portable audio apparatus 200a neither reproduces/outputs from the headphone 202a nor sends the music data to the external apparatuses.

Then, in the above control state, it is judged whether the passenger has operated the audio operation switch 208 of the portable audio apparatus 200a or not (Q21).

If the judgment result in Q21 is YES, an audio operation signal according to the operation of the audio operation switches 208 is output to the corresponding audio apparatus (Q22).

For example, if the music data reproduced/output from the headphone 202a is the music data retained in the audio apparatus 100, an audio operation signal is sent to the audio apparatus 100. Furthermore, if the music data reproduced/output from the headphone 202a is the music data retained in the other portable audio apparatus, the audio operation signal is sent to the other portable audio apparatus 200b. In the case of the own music source 204, the own portable audio apparatus 200a is controlled as is.

On the other hand, if the judgment result in Q21 is NO, the portable audio apparatus 200a maintains its control state without sending the audio operation signal.

Then, it is judged whether the audio operation signal has been received from the external apparatuses or not (Q23).

If the judgment result in Q23 is YES, the audio operation of the internal music data is executed according to the received audio operation signal (Q24), and if the judgment result is NO, the control state is maintained as is and the process shifts to Return.

Thus, if the audio operation signal is received from an external apparatus, the music data of the own portable audio apparatus 200a is subjected to audio-operations by the external apparatus (audio apparatus 100 or other portable audio apparatus 200b).

For example, it is possible to audio-operate the music data of the portable audio apparatus 200a by operating the audio operation switch 107 of the audio apparatus 100 or audio-operate the music data of the audio operation switches 208 of the portable audio apparatus 200b of the external player B by operating the audio operation switches 208 of the portable audio apparatus 200a of the external player A. Thus, operating the own portable audio apparatus without causing trouble to other passengers can freely and easily perform audio operations of the music that one enjoys.

Communication control and audio control of the portable audio apparatuses are carried out in this way.

Figure 9:
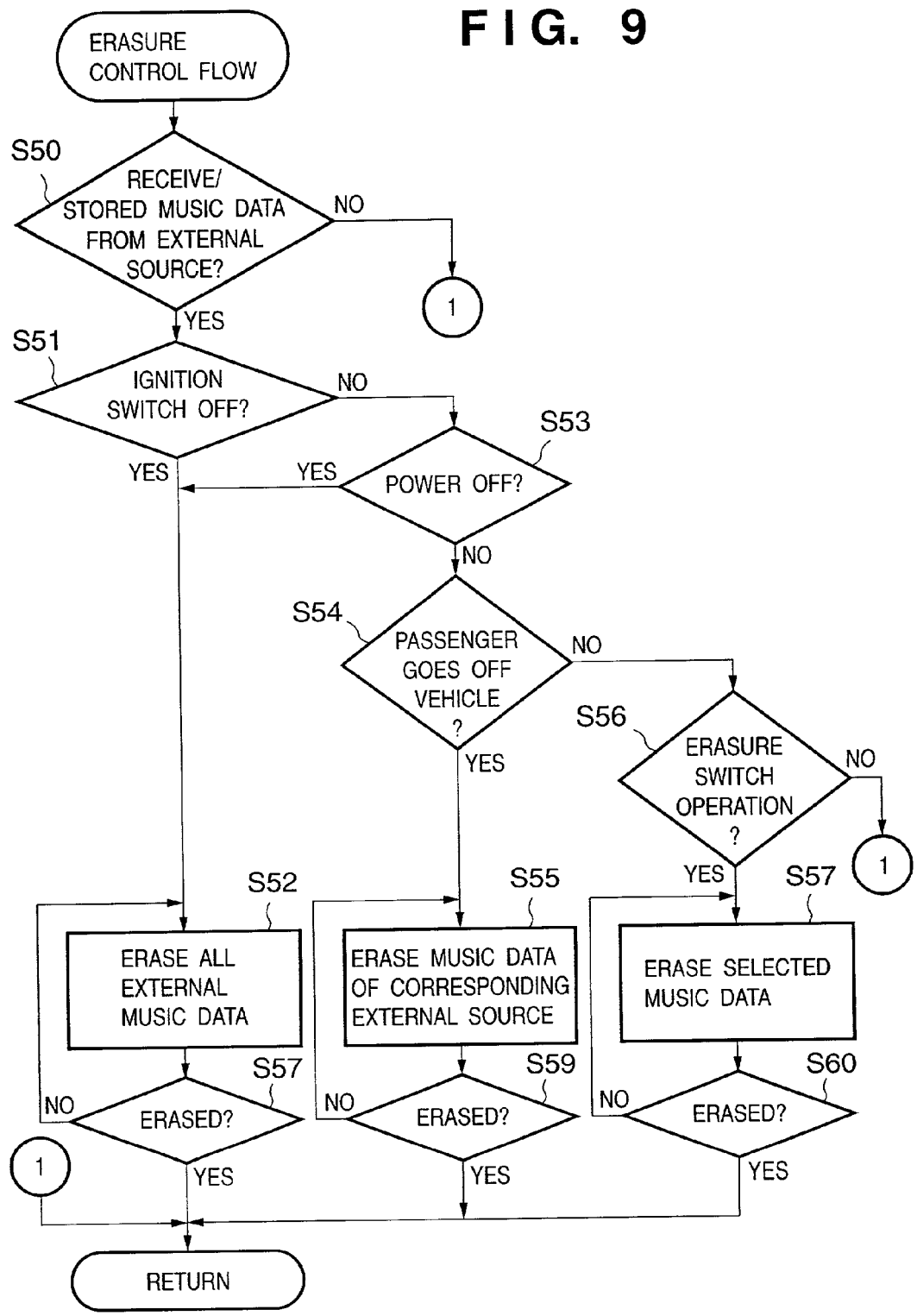
FIG. 9 is a flow chart of music data erasure control of the audio apparatus 100 in this embodiment.

Then, using the flow chart of music data erasure control shown in FIG. 9, the erasure control method whereby the audio apparatus 100 erases the music data of the portable audio apparatus 200 stored in the information storage unit such as semiconductor memory, etc. of the audio apparatus 100 will be explained. This flow chart shows the procedure of the software program executed by the CPU 101.

First, the audio apparatus 100 receives music data from an external source (portable audio apparatus 200a, 200b) and judges whether the received music data has been stored in the information storage unit or not (S50).

If the judgment result in S50 is NO, the process directly shifts to Return and if the judgment result is YES, then it is judged whether an ignition switch (not shown) of the automobile is OFF or not (S51).

If the judgment result in S51 is YES, processing of erasing all music data of the portable audio apparatuses 200a, 200b stored in the information storage unit of the audio apparatus 100 is performed (S52). Note, since a general procedure can be used as the procedure for erasing data stored in the information storage unit of the semiconductor memory, etc. explanations thereof are omitted in this embodiment.

On the other hand, if the judgment result in S51 is NO, it is judged whether the power of the audio apparatus 100 is OFF or not (S53).

If the judgment result in S53 is YES, processing of erasing all music data of the portable audio apparatus stored in the information storage unit of the audio apparatus 100 is carried out as in the case where it is judged that the ignition switch is OFF (S53).

That is, this processing erases all music data of the portable audio apparatus from the information storage unit of the audio apparatus 100 and thereby it is always possible to maximize the storage capacity of the information storage unit at the next time audio control is started.

Thus, when audio control of the audio apparatus is performed next time, it is possible to take in a large amount of music data of a new audio apparatus and reproduce/output more new music pieces in the vehicle.

If the judgment result in S51 is NO, then it is judged whether the passenger has gotten off the vehicle 1 (S54). If this judgment result is YES, the processing of erasing only the music data received from the portable audio apparatus 200b carried by the passenger who has gotten off the vehicle from the information storage unit of the audio apparatus 100 is performed (S55).

That is, in the processing in S55, it is possible to secure the storage capacity enough to store new music data in the information storage unit of the audio apparatus 100 by erasing the music data of the portable audio apparatus 200b carried out of the vehicle with the passenger who has gotten off the vehicle.

Thus, when a new passenger gets on the vehicle, receives music data of a new portable audio apparatus and stores the music data in the information storage unit of the audio apparatus 100, the storage capacity is secured and it is therefore possible to reliably store new music data in the information storage unit of the audio apparatus 100 without considering the storage capacity.

This embodiment is constructed of a seating sensor (not shown) provided on a seat to judge whether the passenger has gotten off the vehicle or not, but it is also possible to judge whether the passenger has gotten off the vehicle or not using other means such as a seat belt sensor.

Instead of the judgment as to whether the passenger has gotten off the vehicle or not, it is also possible to detect that the portable audio apparatus 200 has been carried out of the vehicle directly with a radio wave transmitted from the in-car radio antenna 34 and judge that the portable audio apparatus no longer exists within the communication range (inside the vehicle).

On the other hand, if the judgment result in S54 is NO, it is judged whether an erasure switch (not shown) has been operated (S56). If this judgment result is NO, the process shifts to Return, and if the judgment result is YES, the processing of erasing the music data selected by the passenger from the information storage-unit of the audio apparatus 100 is performed (S57).

That is, this processing can arrange music data in the information storage unit at the request of the passenger by erasing the music data selected by the passenger from the information storage unit of the audio apparatus 100.

Figure 5:
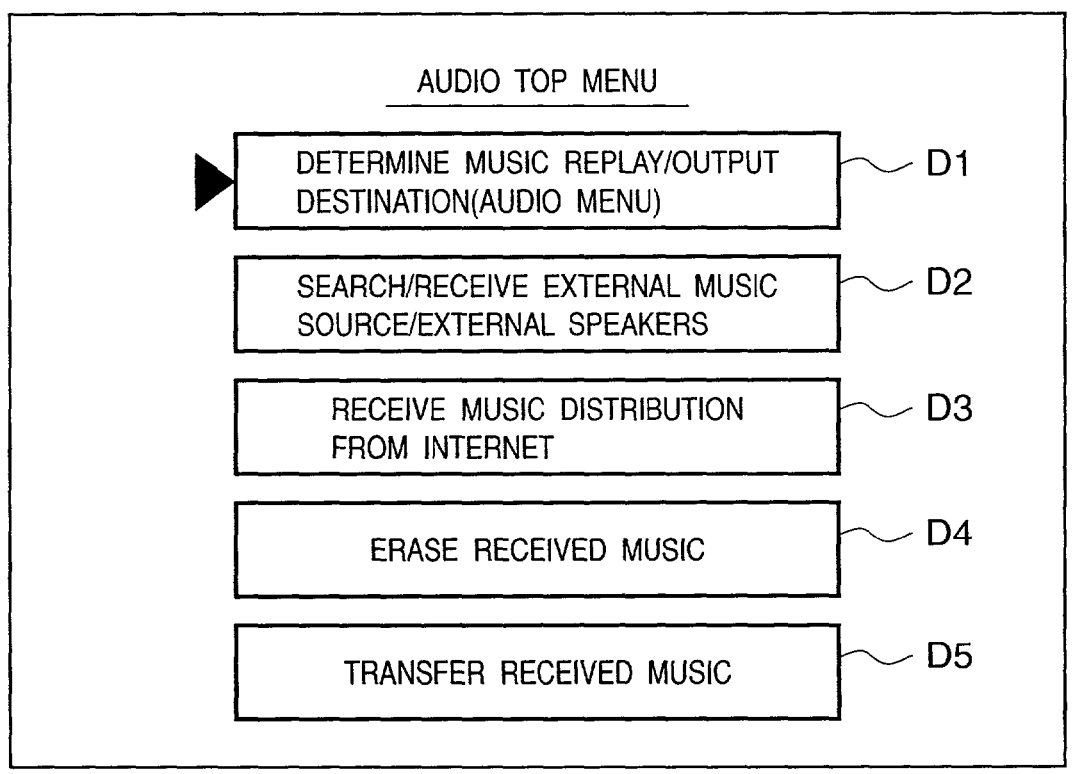
FIG. 5 is an "AUDIO TOP MENU" screen shown on a display in this embodiment.

The erasure operation in S57 is carried out by the passenger operating the audio top switch 58c on the operation panel 51 of the audio apparatus 100, displaying the "AUDIO TOP MENU" screen shown in FIG. 5 on the display screen and selecting/determining "Erase received music" D4 with the cross cursor/determination button 108.

Figure 10:
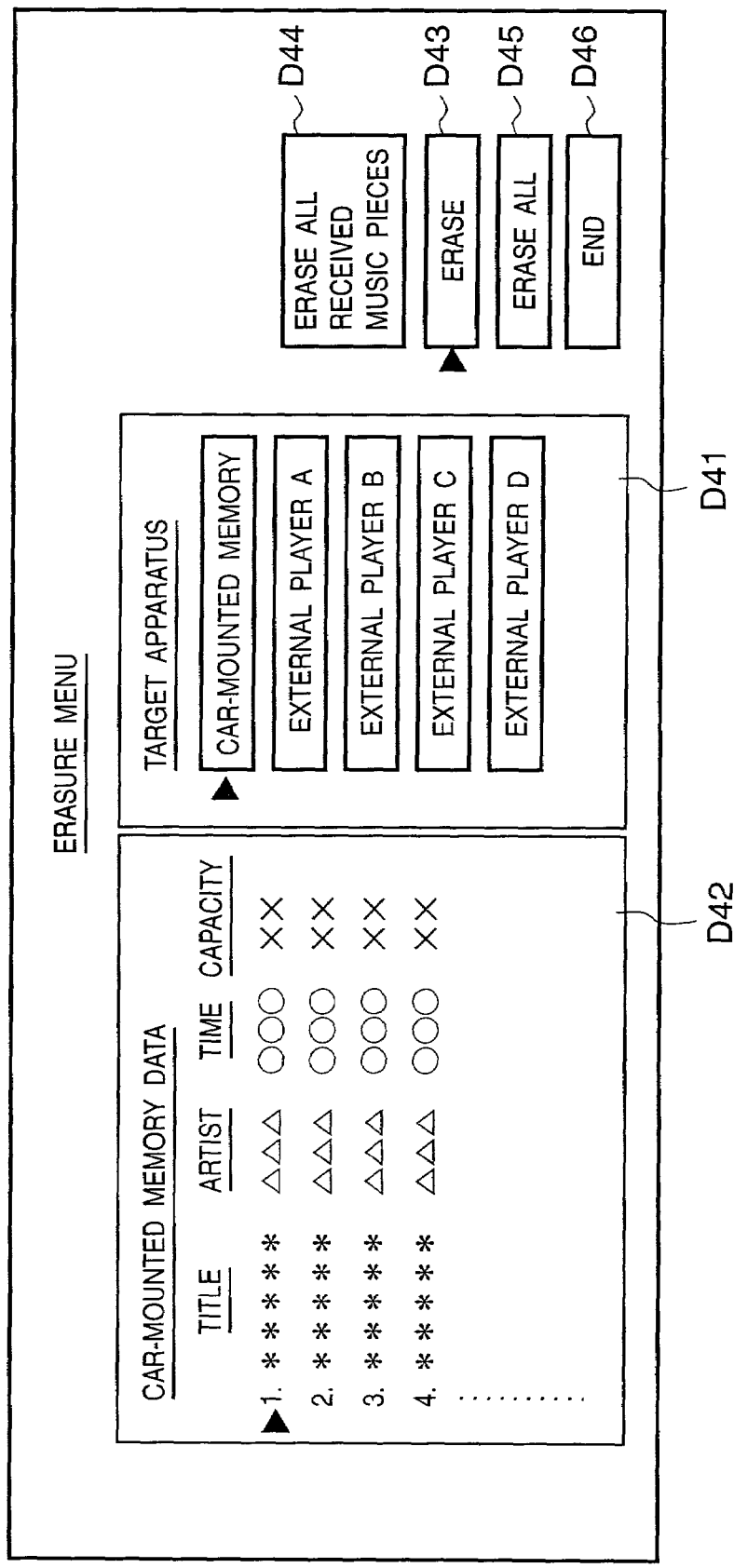
FIG. 10 is an "erasure MENU" screen shown on a display in this embodiment.

If the passenger selects/determines "Erase received music" D4, the display screen is switched to the "Erasure MENU" screen shown in FIG. 10, which displays the storage content of the music data and target apparatuses and erasure method.

From this "Erasure MENU" screen, if the passenger selects/determines the apparatus storing the music data to be erased in the "Target apparatus" selection area D41, the storage content of the corresponding apparatus is displayed in the "Memory data" display area D42.

The music data (contents data) is associated with the corresponding music title data (title data) and the audio apparatus 100 displays characters that represent the corresponding music titles in the "memory data" display area D42 according to the music title data. When the passenger selects/determines the music title of the music data to be erased with the storage content displayed in the "memory data" display area D42 and selects/determines the "Erase" D43, the music data that the passenger wants to erase is erased from the information storage unit of the corresponding apparatus.

For example, if the passenger wants to erase the first music of the information storage unit of the audio apparatus 100, the processing of erasing music data is performed by selecting/determining the selection content shown in the "Erasure MENU" screen in FIG. 10.

Note, this embodiment also sets external players (external player A, external player B, etc.) in the "Target apparatus" selection area D41 so as to erase the storage content of the portable audio apparatuses 200a and 200b, too.

As the erasure method, "Erase all received music pieces" D44 and "Erase all" D45 are set in addition to "Erase" D43. Here, "Erase all received music pieces" means a method of erasing all music data received from other apparatuses and stored and "Erase all" means a method of erasing all music data stored in the information storage unit of a desired apparatus together with music data stored independently.

After erasing the music data to be erased, selecting/determining "End" D46 terminates the erasure operation.

When the music data is erased by the above-described processing, it is confirmed and judged whether the music data has been erased (S58, S59, S60). If this judgment result is NO, that is, if the music data has not been erased completely, or when it has not been possible to confirm the erasure of the music data, the processing of erasing the music data is performed again.

Thus, carrying out processing of re-erasing music data ensures that the music data is erased and the music data of the portable audio apparatuses is erased from the information storage unit of the audio apparatus 100 completely.

If the result of judgment as to whether the music data has been erased in S58, S59 and S60 is YES, the process directly shifts to Return and the erasure processing ends.

Then, the Internet operation will be explained, which receives digital music data from outside the vehicle and reproduces/outputs the music data as music from the speakers 28.

The Internet operation is carried out by the passenger operating the audio top switch 58c on the operation panel 51 of the audio apparatus 100, displaying the "AUDIO TOP MENU" screen shown in FIG. 5 on the display screen and selecting/determining "Receive music from Internet" D3 with a cross cursor/determination button.

Figure 11:
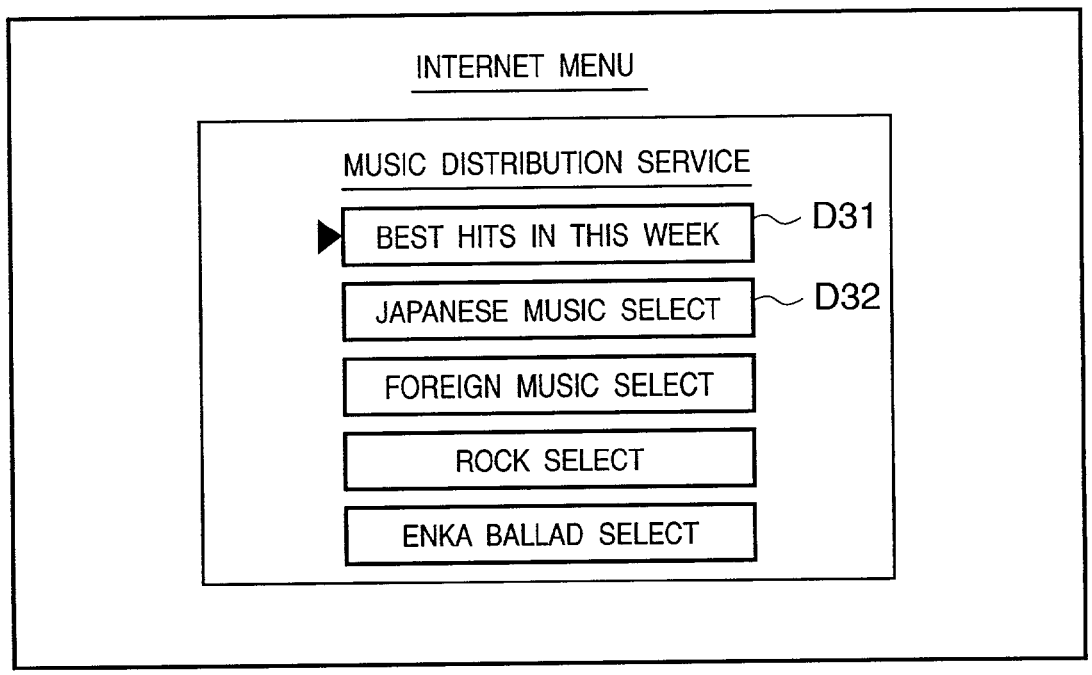
FIG. 11 is an "Internet MENU" screen shown on a display in this embodiment.

When the passenger selects/determines "Receive music from Internet" D3, the display screen is switched to the "Internet MENU" screen shown in FIG. 11 and the apparatus is connected to the Internet.

The "Internet MENU" screen displays the music distribution service site screen and shows "Best hits in this week" D31, "Traditional Japanese music select" D32, etc. allowing the passenger to select music data from a variety of genre.

The passenger selects/determines the item of genre of his/her choice from this "Internet MENU" screen, selects/determines the music data of the music to be distributed and receives the music. Then, the audio apparatus 100 temporarily stores the received music data in the information storage unit and reproduces/outputs the music data as music from the speakers 28 according to the operation of the passenger.

In this way, using music distribution of the Internet makes it possible to replay a large amount of new music in the vehicle.

Then, a data transfer will be explained, which transfers music data stored in each apparatus to another apparatus and sends/receives music data between different apparatuses.

The data transfer operation is carried out by the passenger operating the audio top switch on the operation panel 51 of the audio apparatus 100, displaying the "AUDIO TOP MENU" screen shown in FIG. 5 on the display screen and selecting/determining "Transfer received music" D5 with a cross cursor/determination button.

Figure 12:
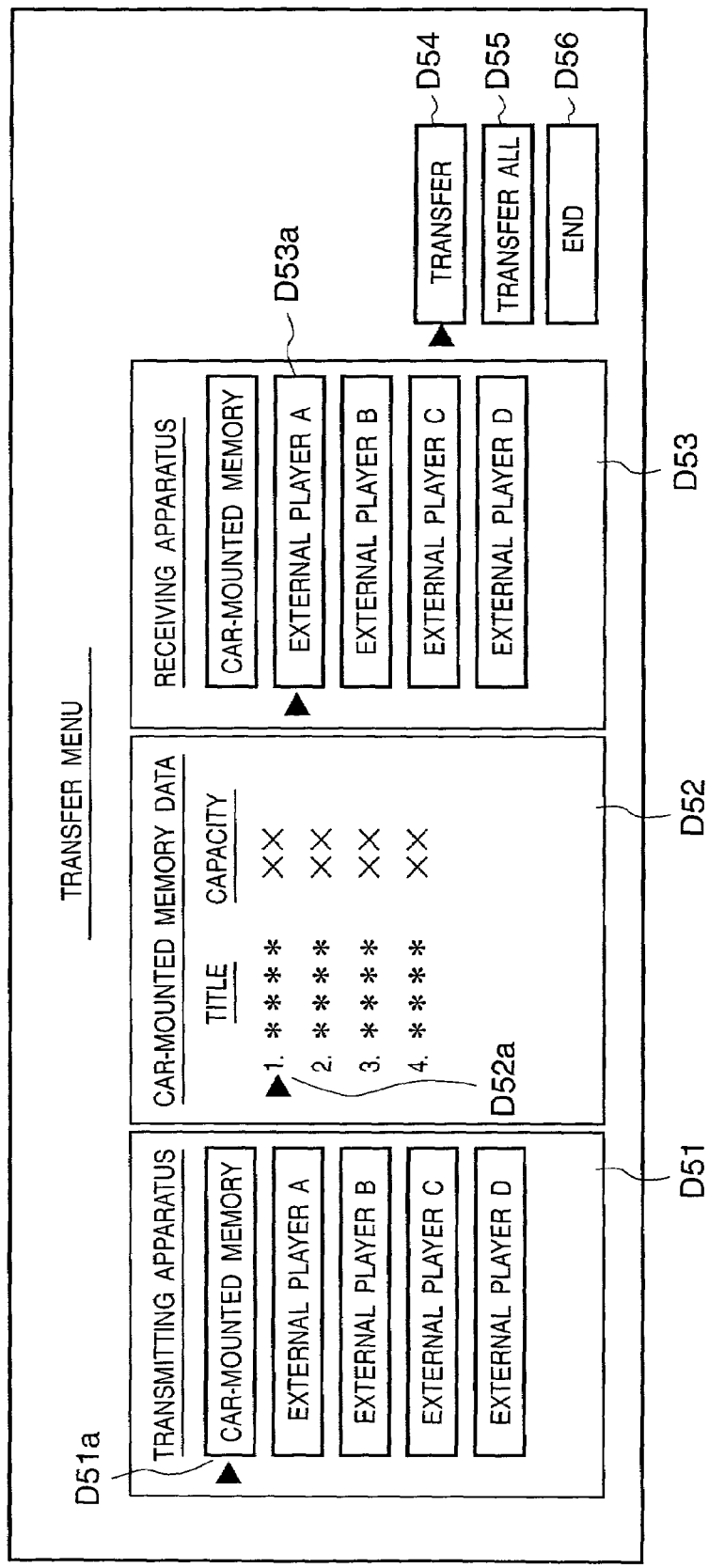
FIG. 12 is a "Transfer MENU" screen shown on a display in this embodiment.

When the passenger selects/determines "Transfer received music" D5, the display screen is switched to the "Transfer MENU" screen shown in FIG. 12 and the transmitting apparatus, storage content of the music data, receiving apparatus and transfer method are shown.

Music data is transferred between different apparatuses by the passenger selecting/determining a desired item with the cross cursor/determination button 108 on the "Transfer MENU" screen.

For example, when the passenger wants to transfer the music data of the first music from the information storage unit of the audio apparatus 100 to a portable audio apparatus 200a of the external player A, the passenger selects/determines the "Car-mounted memory" D51a in the "Transmitting apparatus" selection area D51 as the selection content of the "Transfer MENU" screen, displays the car-mounted memory data D52, which is the storage content of the information storage unit of the audio apparatus 100 and selects/determines the music data D52a of the first music in the car-mounted memory data D52. Then, the passenger selects/determines the external player AD53a in the "Receiving apparatus" selection area D53.

After selecting/determining music data in this way, selecting/determining the "Transfer" D54 allows the music data of the first music to be transferred from the information storage unit of the audio apparatus 100 to the portable audio apparatus 200a of the external player A.

If the passenger wants to transfer all music data, the passenger selects/determines "Transfer all" D55 in the car-mounted memory data D52 instead of selecting/determining specific music, then all music data is transferred at a time.

After transferring music data, selecting/determining "End" D56 terminates the data transfer operation.

In this data transfer, selecting/determining external players in the "Transmitting apparatus" selection area D51 and the "Receiving apparatus" selection area D53 also allows a data transfer of music data between the selected plurality of portable audio apparatuses 200.

A data transfer being enabled between apparatuses, it is possible to easily exchange music data not only between the audio apparatus 100 and portable audio apparatuses 200 but also between the portable audio apparatuses. Thus, it is possible to freely exchange music data of preference between passengers or freely transfer music data of the audio apparatus 100 to a portable audio apparatus.

MODIFICATIONS

First Modification

Then, a modification of the audio apparatus 100 with a different transmission/reception method of music data will be explained. The following explanations will describe only points with a different configuration from that of the above embodiment and overlapping explanations will be omitted.

Figure 4:
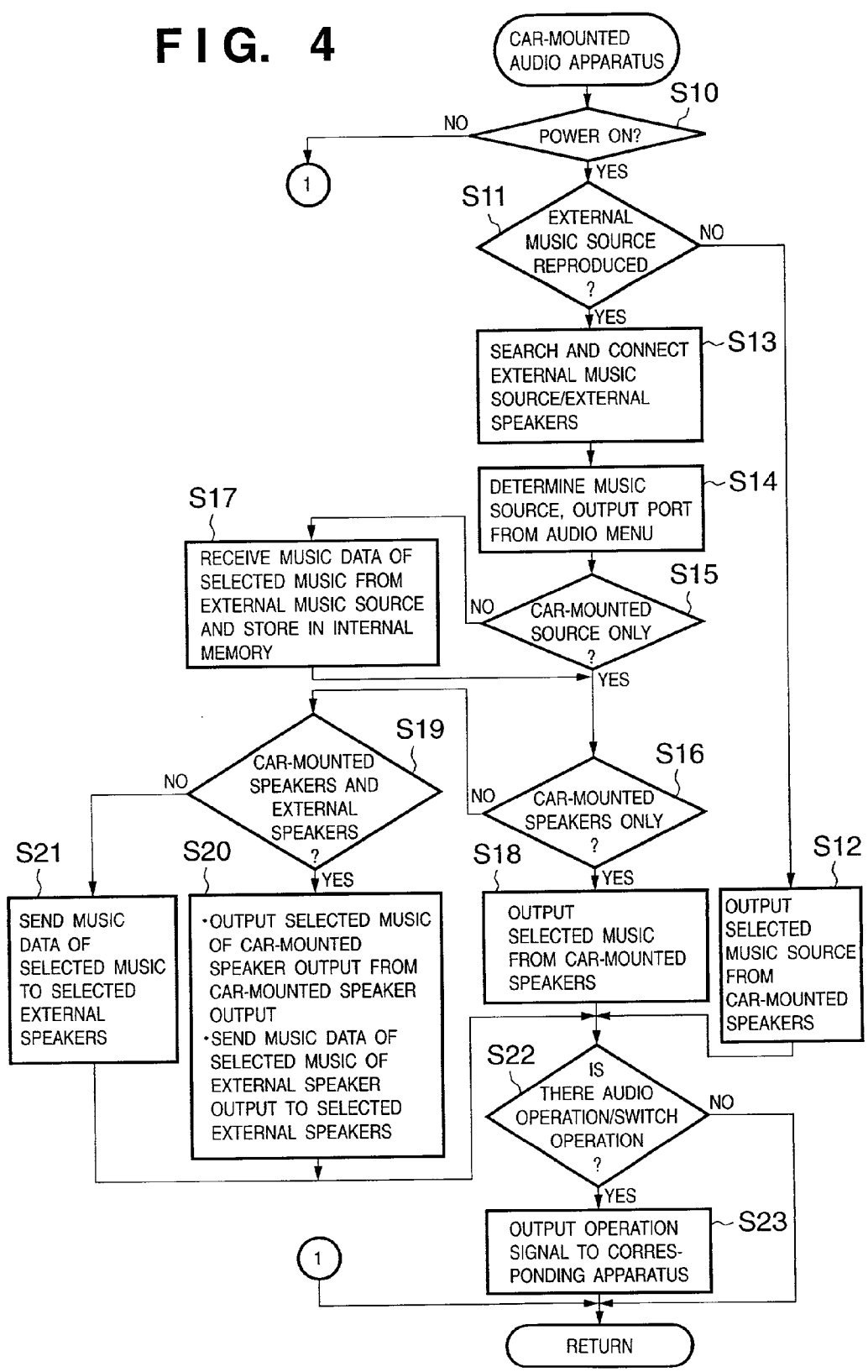
FIG. 4 is a flow chart of operation control of the audio apparatus 100 in this embodiment.
Figure 13:
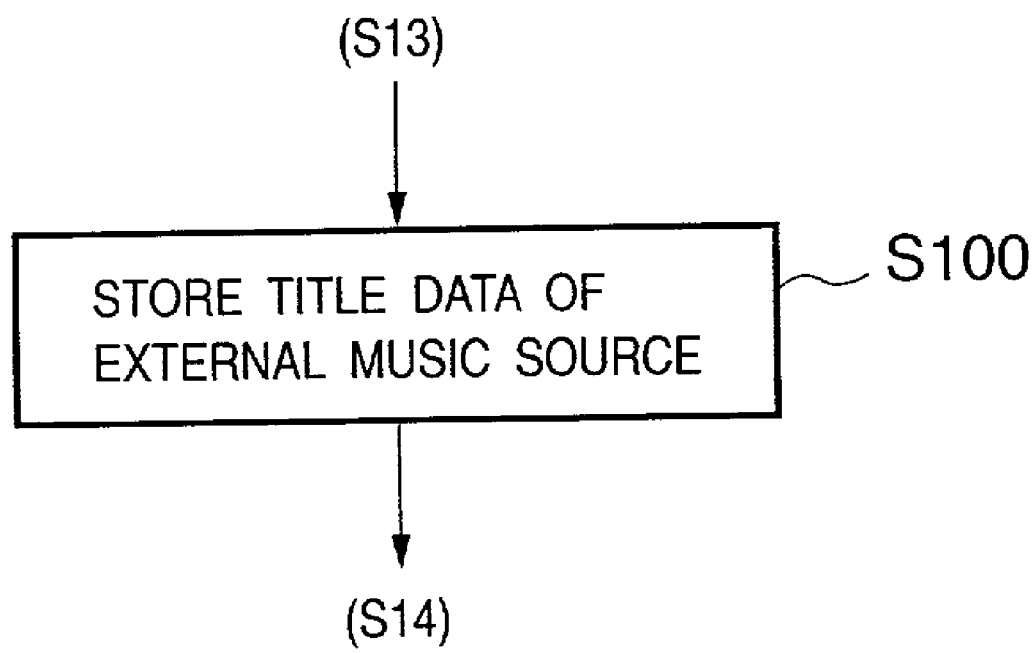
FIG. 13 is a partial flow chart showing a processing step added to the flowchart in FIG. 4 in a first modification of this embodiment.
Figure 14:
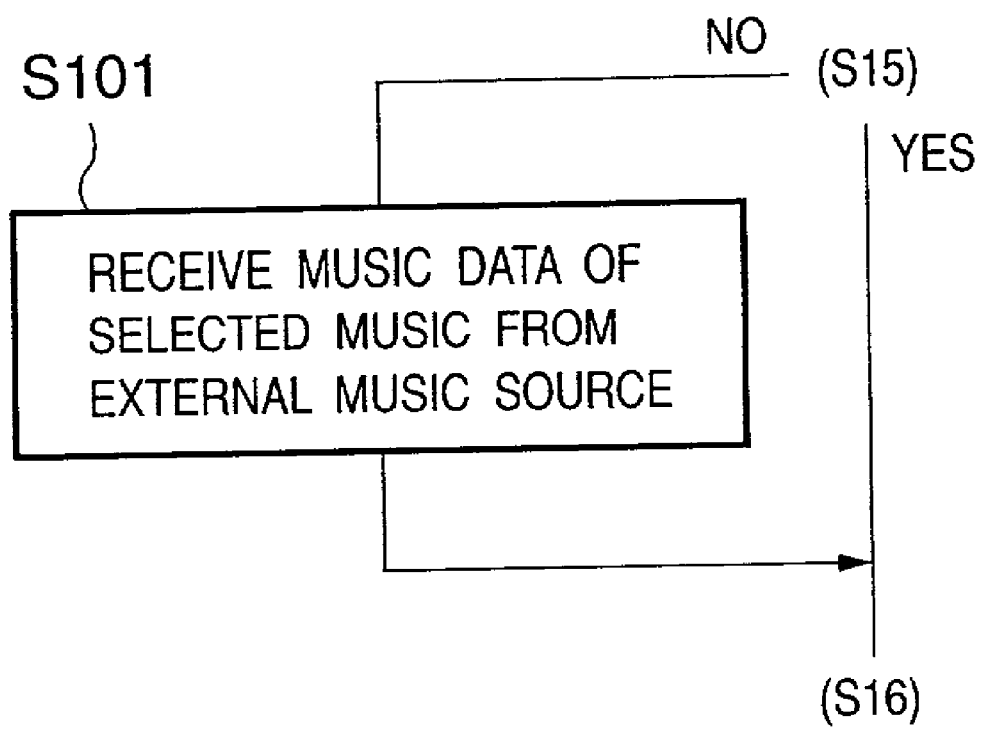
FIG. 14 is a partial flow chart showing a processing step of changing the flow chart in FIG. 4 in the first modification of this embodiment.

In this modification, part of the flow chart of operation control in FIG. 4 in the embodiment above is changed as shown in FIG. 13 and FIG. 14.

That is, in this modification, a step (S100) of storing music title data of an external music source is inserted between S13 and S14 of the flow chart of operation control in FIG. 4 as shown in FIG. 13 and control is performed with S17 shown in FIG. 4 changed to step (S101) of receiving music data of the selected music from an external music source of FIG. 14.

That is, in the operation control executed by the audio apparatus 100 in this modification, only the music title data of the music data and its music title data stored in the portable audio apparatuses 200a and 200b is stored in the information storage unit of the audio apparatus 100 beforehand. Then, before listening to desired music in the vehicle, the passenger recognizes music titles of the music data stored in the portable audio apparatuses 200a and 200b by means of the display of music titles by the audio apparatus 100 using the stored music title data and selects desired music title from the music titles displayed.

When reproducing the music data corresponding to the title name (music title data) selected as shown above according to the operation by the passenger, the audio apparatus 100 receives the music data corresponding to the music title data from the portable audio apparatuses 200a and 200b and immediately performs predetermined processing such as decoding without storing it in the information storage unit of the audio apparatus 100 and controls so that the music data is reproduced/output from the speakers 28 and other portable audio apparatuses.

Such control eliminates the need to store the music data in the in formation storage unit of the audio apparatus 100, and therefore it is possible to set the information storage capacity of the information storage unit to a smaller amount and it is not necessary to erase the music data from the information storage unit.

Second Modification

Figure 15:
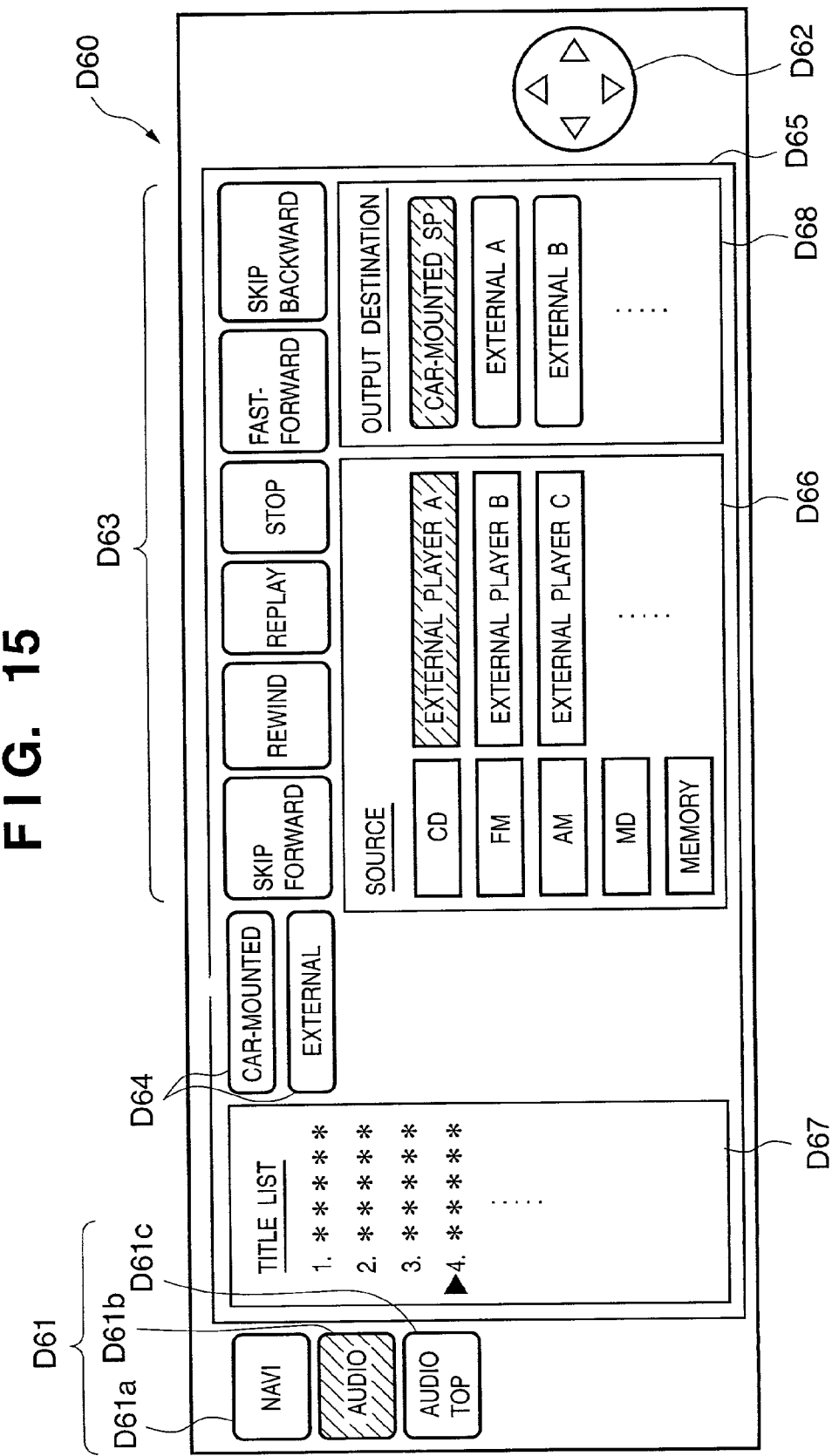
FIG. 15 is a screen shown on a display in a second modification of this embodiment.

Then, FIG. 15 shows the display screen of this modification.

In this modification, display screen D60 shows a screen changeover switch D61 (NAVI switch D61a, AUDIO switch D61b, AUDIO TOP switch D61c) that switches between the display screens, a cross cursor/determination button D62 that determines a predetermined item, an audio operation switch D63 to enter an audio operation signal and an output changeover switch D64 that switches the output destination of the audio operation signal and allows the passenger to perform audio operations from the display screen D60.

That is, this modification constructs the display screen D60 with a touch panel allowing the passenger to enter audio operations to the audio apparatus 100 by directly touching the screen.

In this modification, the method of input operations by the audio apparatus 100 and control content are mostly the same as those in the embodiment above.

That is, when the passenger selects the audio switch D61a with the screen changeover switch D61, the "AUDIO MENU" screen D65 appears in the center and for example, the passenger selects/determines the external player A in the Source" selection area D66 on the AUDIO MENU" screen, the 4th music in the "Music title list" selection area D67 and the speakers 28 in the "Output destination" selection area D67 with the cross cursor/determination button D62, and thereby the audio apparatus 100 determines the reproduction/output destination of the music (see FIG. 15).

Then, when an audio operation signal of reproduction and stop, etc. of the music data according to the input operation of the passenger is output from the audio operation switch D63, the audio apparatus 100 outputs the audio operation signal to the corresponding apparatus according to the setting condition of the output changeover switch D64.

Note, when the AUDIO TOP switch D61c is selected, various selection processing screens are displayed on the display screen D60 as in the case of the embodiment above allowing selection operation.

As described above, this modification is constructed so that the passenger can perform audio operations by directly touching the display screen, thus making it possible to eliminate audio operation switches, etc. from the operation panel 51 of the audio apparatus 100 set in the instrument panel. This makes the configuration of the operation panel 51 compact and allows the passenger to directly operate the audio apparatus while watching the display screen, thus improving operability.

As described above, the embodiments and their modifications above have the following effects.

First, this embodiment sends music data retained in the portable audio apparatuses 200a and 200b to the audio apparatus 100 by means of radio communication, the audio apparatus 100 receives the music data and the speakers 28 in the vehicle reproduce/output the music data. This makes it possible to easily and reliably reproduce/output the music data retained in the portable audio apparatus from the speakers 28 by means of radio communication without the passenger bothering to mount the portable audio apparatuses 200a and 200b on the mount, etc.

This-makes it possible to replay preferred music using music data in the portable audio apparatus that the passenger carries without downloading the music data from the Internet, thus improving operability and convenience and furthermore attaining cost reduction.

Especially, storing music data in the information storage unit of the audio apparatus 100 allows the music data to be reproduced more reliably in the vehicle.

Note, if only music title data is stored in the music data of the audio apparatus 100 without storing the music data in the information storage unit of the audio apparatus 100 as in the case of the first modification above with reference to FIG. 13 and FIG. 14, it is not necessary to store a large volume of music data in the storage unit of the audio apparatus 100, and it is possible to set a smaller amount of storage of the information storage unit of the audio apparatus 100.

Moreover, this embodiment allows the passenger to perform audio operations of the portable audio apparatuses 200a and 200b by operating the audio operation switches 107 of the audio apparatus 100. Because of this, even if the music data is retained in the portable audio apparatuses 200a and 200b, the audio apparatus 100 can directly perform audio operations of the music data of the audio apparatuses 200a and 200b.

Furthermore, in this embodiment, when a passenger gets off the vehicle, or when the ignition switch of the vehicle 1 is turned OFF or when the power of the audio apparatus 100 is turned OFF, the audio apparatus 100 automatically erases music data stored in the information storage unit of a semiconductor memory, etc. This makes it possible to secure a storage capacity enough to newly store other music data in the information storage unit.

Thus, when another passenger gets on the vehicle or when the next audio control is performed, it is possible to reliably store music data of a new portable audio apparatus without considering the storage capacity.

Furthermore, in this embodiment, when it is not confirmed that music data has been erased, the audio apparatus 100 erases music data stored in the information storage unit again. This makes it possible to reliably erase music data from the information storage unit.

Furthermore, this embodiment allows the passenger to freely select the mode of use of the portable audio apparatuses 200a and 200b in the vehicle by switching between a communication stage in which music data is transmitted/received between the apparatuses 100, 200a and 200b, and a non-communication state without performing transmission/reception of music data between apparatuses using the internal/external changeover switch 209 of the portable audio apparatuses 200a and 200b.

Furthermore, this embodiment allows the passenger to visually check the physically invisible connection state of radio communication by visibly displaying the communication connection state of the audio apparatus 100 and portable audio apparatuses 200a and 200b through the connection situation D21 of the "Reception MENU" screen and reliably judge the connection state of the audio apparatus 100 and portable audio apparatuses 200a and 200b.

Furthermore, this embodiment constructs a radio communication network made up of respective apparatuses by assigning identification addresses to a plurality of portable audio apparatuses 200a and 200b that exist within the radio communication range of the audio apparatus 100 and thereby identifying the apparatuses. This allows the audio apparatus 100 to reliably recognize which of the portable audio apparatuses 200a and 200b in such a radio communication network has sent the music data and control reproduction of the music.

Furthermore, in this embodiment, the audio apparatus 100 receives a plurality of music data pieces sent from a plurality of portable audio apparatuses 200a and 200b, reproduces/outputs one music data piece as music from the speakers 28 and reproduces/outputs other music data pieces as music from the headphones of the portable audio apparatuses 200a and 200b. When a plurality of portable audio apparatuses 200a and 200b is connected by means of radio communication in the vehicle, different music data pieces are reproduced simultaneously from the speakers 28 and portable audio apparatuses 200a and 200b, and thereby passengers of the vehicle 1 can replay desired music individually.

Furthermore, in this embodiment, a plurality of portable audio apparatuses 200a and 200b are connected to the audio apparatus 100 with communication capability by means of radio communication, music data retained in one portable audio apparatus 200b is sent to the other portable audio apparatus 200a and the relevant music data can be reproduced/output as music from the other portable audio apparatus 200a. This allows the passenger to replay the music data retained in the portable audio apparatus 200b of another passenger as music using the own portable audio apparatus 200a.

Furthermore, in this embodiment, when the passenger selects/determines "Search" D24 from the "Reception MENU" screen and performs connection operation only at the initial audio control, it is possible to eliminate the possibility of erroneous connection even if other portable audio apparatuses enter into the communication range of the audio apparatus 100 during music control such as when the vehicle is traveling, thereby preventing disturbance of control.

On the other hand, while "Update" D25 is selected/determined on the "Reception MENU" screen during audio control, the audio apparatus 100 in this embodiment automatically performs connection operation at predetermined time intervals and can thereby eliminate the need for the passenger to perform connection operation every time a new portable audio apparatus is connected.

The method of controlling the audio apparatus in the above embodiments and their modifications is implemented by the CPUs inside these apparatuses executing the control program stored in the concentrated control unit 20 that performs system control of the audio apparatus 100 and portable audio apparatus 200, etc. Furthermore, providing such a control program stored in a program storage medium separately will also allow the control unit of another audio apparatus, etc. to execute the above-described control processing.

The embodiments of the present invention have been explained up to this point, but the present invention is not limited to these embodiments and is applicable to any case where at least portable audio apparatuses are carried into a vehicle, music data retained by the portable apparatuses is sent to a car-mounted audio apparatus via in-car radio communication and passengers enjoy music through car-mounted speakers.

That is, for example, even a portable audio apparatus mounted on a charge mount, which performs transmission/reception of music data via in-car radio communication, can also be included in the scope of the present invention and detailed configuration can be changed as appropriate without departing from the spirit of the present invention.

As many apparently widely different embodiments of the present invention can be made without departing from the spirit and scope thereof, it is to be understood that the invention is not limited to the specific embodiments thereof except as defined in the claims.

What is claimed is:

1. An audio system that reproduces contents information as sound in a vehicle comprising:
   a portable audio apparatus carried by a passenger of said vehicle; and
   an audio apparatus mounted in said vehicle,
   wherein said portable audio apparatus includes
      a contents information storage medium for retaining contents information, and
      a transmission module for transmitting said contents information to said audio apparatus at least by radio communication,
   wherein said audio apparatus includes
      a reception model for receiving said contents information from said portable audio apparatus by radio communication,
      a storage medium for storing said contents information received by said reception module,
      a control unit for reproducing said contents information stored in said storage medium and outputting the reproduced contents information as sound from speakers mounted in said vehicle, and
      a detection unit for detecting whether a passenger of said vehicle has gotten off the vehicle or not,
      wherein said control unit includes an erasure module for erasing information stored in said storage medium according to the detection of said detection unit that a passenger of said vehicle has gotten off the vehicle.

2. The audio system according to claim 1, wherein said control unit further includes a checking module for checking whether information stored in said storage medium has been erased by said erasure module or not, and
   said erasure module, when the erasure is not confirmed by said checking module, erases information stored in said storage medium again.

3. An audio system that reproduces contents information as sound in a vehicle, comprising:
   a portable audio apparatus carried by a passenger of said vehicle; and
   an audio apparatus mounted in said vehicle,
   wherein said portable audio apparatus includes
      a contents information storage medium for retaining contents information, and
      a transmission module for transmitting said contents information to said audio apparatus at least by radio communication,
   wherein said audio apparatus includes
      a reception module for receiving said contents information from said portable audio apparatus by radio communication,
      a storage medium for storing said contents information received by said reception module,
      a control unit for reproducing said contents information stored in said storage medium and outputting the reproduced contents information as sound from sneakers mounted in said vehicle, and
      a detection unit for detecting ignition OFF of said vehicle,
      wherein said control unit includes an erasure module for erasing information stored in said storage medium according to the detection by said detection unit of ignition OFF of said vehicle.

4. An audio system that reproduces contents information as sound in a vehicle, comprising:
   a portable audio apparatus carried by a passenger of said vehicle; and
   an audio apparatus mounted in said vehicle,
   wherein said portable audio apparatus includes
      a contents information storage medium for retaining contents information, and
      a transmission module for transmitting said contents information to said audio apparatus at least by radio communication.
   wherein said audio apparatus includes
      a reception module for receiving said contents information from said portable audio apparatus by radio communication,
      a storage medium for storing said contents information received by said reception module,
      a control unit for reproducing said contents information stored in said storage medium and outputting the reproduced contents information as sound from speakers mounted in said vehicle, and
      a detection unit for detecting that said portable audio apparatus has been carried out of said vehicle,
      wherein said control unit includes an erasure module for erasing information stored in said storage medium according to the detection by said detection unit that said portable audio apparatus has been carried out of the vehicle, and checking module for checking whether information stored in said storage medium has been erased by said erasure module or not, and
      wherein said erasure module, when the erasure is not confirmed by said checking module, erases information stored in said storage medium again.

5. An audio system that reproduces contents information as sound in a vehicle comprising:
   a portable audio apparatus carried by a passenger of said vehicle; and
   an audio apparatus mounted in said vehicle,
   wherein said portable audio apparatus includes
      a storage medium for retaining contents information and title information associated with said contents information,
      title information transmission modules for transmitting the title information associated with said contents information to said audio apparatus at least by radio communication, and
      contents information transmission modules for transmitting the contents information corresponding to the title information received from said audio apparatus to said audio apparatus at least by radio communication,
   wherein said audio apparatus includes
      a title information reception module for receiving said title information from said portable audio apparatus at least by radio communication,
      a storage medium for storing said title information received by said title information reception module, a man-machine interface for notifying titles in said vehicle according to said title information stored in said storage medium and allowing the passenger of said vehicle to select contents information to be received from said portable audio apparatus with reference to the notified titles, a request transmission module for transmitting the title information corresponding to the titles selected by said man-machine interface to said portable audio apparatus at least by radio communication in order to request for the transmission of contents information corresponding to the selected titles.

a control unit for receiving and reproducing said contents information corresponding to said selected titles from said portable audio apparatus at least by radio communication and outputting the reproduced contents information as sound from the speakers mounted in said vehicle, and a detection unit for detecting whether a passenger of said vehicle has gotten off the vehicle or not, wherein said control unit includes an erasure module for erasing information stored in said storage medium according to the detection by said detection unit that a passenger of said vehicle has gotten off the vehicle.

6. The audio system according to claim 5, wherein said control unit further includes a checking module for checking whether information stored in said storage medium has been erased by said erasure module or not, and said erasure module, when the erasure is not confirmed by said checking means, erases information stored in said storage medium again.

7. An audio system that reproduces contents information as sound in a vehicle, comprising:

a portable audio apparatus carried by a passenger of said vehicle; and an audio apparatus mounted in said vehicle, wherein said portable audio apparatus includes
a storage medium for retaining contents information and its title information, associated with each other,
title information transmission modules for transmitting the title information associated with said contents information to said audio apparatus at least by radio communication,
contents information transmission modules for transmitting the contents information corresponding to the title information received from said audio apparatus to said audio apparatus at least by radio communication, and wherein said audio apparatus includes
a title information reception module for receiving said title information from said portable audio apparatus at least by radio communication,
a storage medium for storing said title information received by said title information reception module,
a man-machine interface for notifying titles in said vehicle according to said title information stored in said storage medium and allowing the passenger of said vehicle to select contents information to be received from said portable audio apparatus with reference to the notified titles,
a request transmission module for transmitting the title information corresponding to the titles selected by said man-machine interface to said portable audio apparatus at least by radio communication in order to request for the transmission of contents information corresponding to the selected titles,
a control unit for receiving and reproducing said contents information corresponding to said selected titles from said portable audio apparatus at least by radio communication and outputting the reproduced contents information as sound from the speakers mounted in said vehicle, and
a detection unit for detecting ignition OFF of said vehicle,
wherein said control unit includes an erasure module for erasing information stored in said storage medium according to the detection of said detection unit of ignition OFF of said vehicle.

8. An audio system that reproduces contents information as sound in a vehicle, comprising:

a portable audio apparatus carried by a passenger of said vehicle; and an audio apparatus mounted in said vehicle, wherein said portable audio apparatus includes
a storage medium for retaining contents information and its title information associated with each other,
title information transmission modules for transmitting the title information associated with said contents information to said audio apparatus at least by radio communication, and
contents information transmission modules for transmitting the contents information corresponding to the title information received from said audio apparatus to said audio apparatus to said audio apparatus at least by radio communication, wherein said audio apparatus includes
title information reception module for receiving said title information from said portable audio apparatus at least by radio communication,
a storage medium for storing said title information received by said title information reception module,
a man-machine interface for notifying titles in said vehicle according to said title information stored in said storage medium and allowing the passenger of said vehicle to select contents information to be received from said portable audio apparatus with reference to the notified titles,
a request transmission module for transmitting the title information corresponding to the title selected bys aid man-machine interface to said portable audio apparatus at least by radio communication in order to request for the transmission of contents information corresponding to the selected titles,
a control unit for receiving and reproducing said contents information corresponding to said selected titles from said portable audio apparatus at least by radio communication and outputting the reproduced contents information as sound from the speakers mounted in said vehicle, and
a detection unit for detecting that said portable audio apparatus has been carried out of said vehicle,
wherein said control unit includes
an erasure module for erasing information stored in said storage medium according to the detection by said detection unit that said portable audio apparatus has been carried out of the vehicle, and
a checking module for checking whether information stored in said storage medium has been erased by said erasure module or not, and
wherein said erasure module, when the erasure is not confirmed by said checking module, erases information stored in said storage medium again.

9. A contents reproduction method of an audio system that reproduces contents information as sound in a vehicle, comprising:
- constructing a communication system constructed of portable audio apparatus carried by a passenger of said vehicle and an audio apparatus mounted in said vehicle that performs at least radio communication;
- transmitting contents information pre-stored in said portable audio apparatus to said audio apparatus at least by radio communication;
- storing contents information acquired in said contents information transmitting step in a recording medium of said audio apparatus;
- reproducing said contents information stored in said storage medium and outputting the reproduced information as sound from speakers mounted in said vehicle;
- erasing said contents information stored in said storage medium; and
- checking whether said contents information stored in said storage medium has been erased or not and re-erasing said contents information if the erasure is not confirmed.

* * * * *

UNITED STATES PATENT AND TRADEMARK OFFICE
CERTIFICATE OF CORRECTION

PATENT NO.        : 7,158,842 B2
APPLICATION NO. : 09/827919
DATED             : January 2, 2007
INVENTOR(S)      : Hiroshi Ohmura et al.

It is certified that error appears in the above-identified patent and that said Letters Patent is hereby corrected as shown below:

Column 5, Line 36, change "radio-communication" to --radio communication--.

Column 6, Line 45, change "flowchart" to --flow chart--.

Column 13, Line 21, "the-selected" to --the selected--.

Column 17, Line 18, change "storage-unit" to --storage unit--.

Column 19, Line 8, change "player AD53a" to --player A D53a--.

Column 21, Line 8, change "This-makes" to --This makes--.

Column 24, Line 2, claim 3 change "sneakers" to --speakers--.

Column 24, Line 19, claim 4 change "communication." to --communication,--.

Column 24, Line 36, claim 4 after "and" insert --a--.

Column 25, Line 12, claim 5 change "titles." to --titles,--.

Column 26, Line 28 claim 6 delete "to said audio apparatus" (second occurrence) before "at least".

Column 26, Lines 43-44, claim 8 change "bys aid" to --by said--.

Signed and Sealed this

Twenty-second Day of May, 2007

JON W. DUDAS
*Director of the United States Patent and Trademark Office*